(12) United States Patent
Nishiyama et al.

(10) Patent No.: US 7,230,666 B2
(45) Date of Patent: Jun. 12, 2007

(54) LIQUID CRYSTAL DISPLAY WITH NONCONDUCTIVE PORTIONS IN SPECIFIC AREAS

(75) Inventors: Kazuhiro Nishiyama, Hirakata (JP); Yukio Tanaka, Kyoto (JP); Kazunori Komori, Sanda (JP); Akio Takimoto, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 13 days.

(21) Appl. No.: 10/669,320

(22) Filed: Sep. 25, 2003

(65) Prior Publication Data

US 2004/0057002 A1   Mar. 25, 2004

Related U.S. Application Data

(62) Division of application No. 09/450,415, filed on Nov. 30, 1999, now Pat. No. 6,690,440.

(30) Foreign Application Priority Data

Feb. 12, 1999   (JP) .................................. 11-034545
Aug. 5, 1999    (JP) .................................. 11-222396

(51) Int. Cl.
    *G02F 1/1343*      (2006.01)
(52) U.S. Cl. ..................... 349/141; 349/139; 349/143; 349/129; 349/144; 349/130
(58) Field of Classification Search ................ 349/139, 349/143, 129, 144, 84, 141
    See application file for complete search history.

(56) References Cited

U.S. PATENT DOCUMENTS

| | | | |
|---|---|---|---|
| 3,964,158 A | 6/1976 | Janning | 29/592 |
| 3,981,559 A | 9/1976 | Channin | 350/160 |
| 4,232,947 A | 11/1980 | Funada et al. | 350/341 |
| 5,040,875 A * | 8/1991 | Noguchi | 349/143 |
| 5,084,778 A * | 1/1992 | DeJule et al. | 349/143 |
| 5,229,873 A | 7/1993 | Hirose et al. | 359/55 |
| 5,309,264 A | 5/1994 | Lien et al. | 359/87 |
| 5,384,650 A | 1/1995 | TeKolste et al. | 359/77 |
| 5,644,415 A | 7/1997 | Aoki et al. | 349/122 |
| 5,717,474 A | 2/1998 | Sarma | 349/85 |
| 5,729,318 A * | 3/1998 | Yamada et al. | 349/156 |
| 5,796,459 A | 8/1998 | Bryan-Brown et al. | 349/132 |
| 5,907,380 A * | 5/1999 | Lien | 349/141 |
| 6,097,464 A * | 8/2000 | Liu | 349/130 |
| 6,100,953 A * | 8/2000 | Kim et al. | 349/129 |

(Continued)

FOREIGN PATENT DOCUMENTS

EP    0 289 071    11/1988

(Continued)

*Primary Examiner*—Andrew Schechter
*Assistant Examiner*—Lucy Chien
(74) *Attorney, Agent, or Firm*—Steptoe & Johnson LLP

(57) ABSTRACT

The present invention relates to a liquid crystal element wherein a liquid crystal having a liquid crystal molecule is held between two substrates.

An information for aligning a liquid crystal molecule 103 in two or more directions phasedly or gradually by applying voltage is provided for two substrates 101 and 102. The information for aligning is provided for the liquid crystal molecule 103 through irregularities in a wave plate and rubbing formed on a substrate.

12 Claims, 25 Drawing Sheets

U.S. PATENT DOCUMENTS

| | | | |
|---|---|---|---|
| 6,204,905 B1* | 3/2001 | Koma et al. | 349/138 |
| 6,256,080 B1* | 7/2001 | Colgan et al. | 349/129 |
| 6,778,244 B2* | 8/2004 | Song et al. | 349/129 |
| 2002/0054265 A1* | 5/2002 | Song et al. | 349/143 |
| 2005/0012876 A1* | 1/2005 | Yakovenko et al. | 349/110 |

FOREIGN PATENT DOCUMENTS

| | | |
|---|---|---|
| EP | 0 874 264 | 10/1998 |
| JP | 3-259121 | 11/1991 |
| JP | 6-301036 | 10/1994 |
| WO | WO 97/39382 | 10/1997 |
| WO | WO 98/59275 | 12/1998 |

* cited by examiner

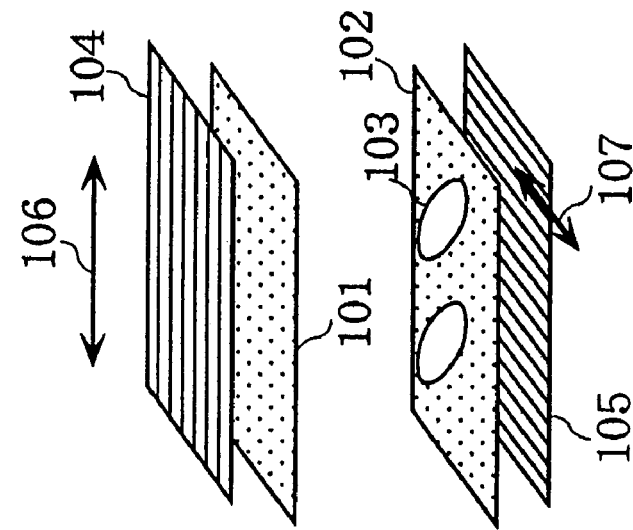
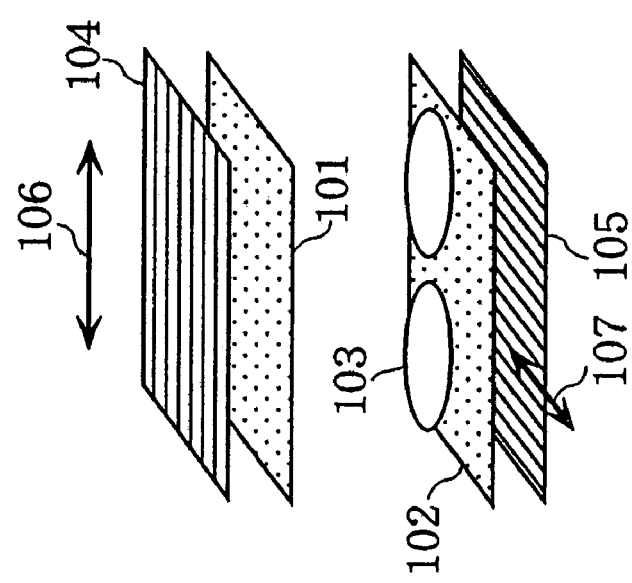
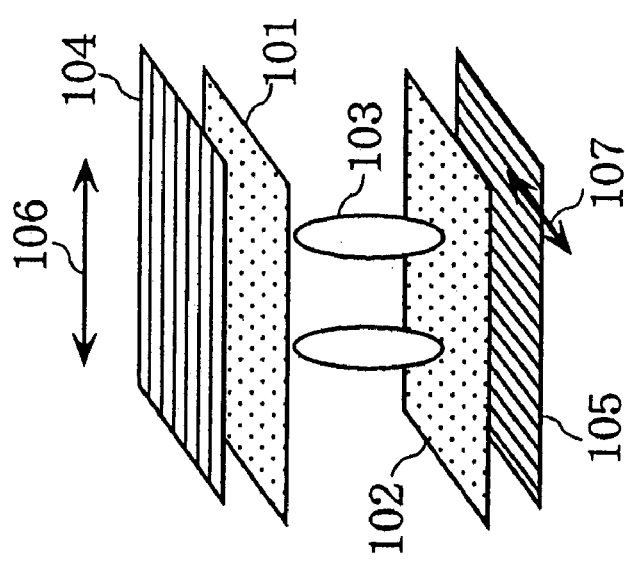

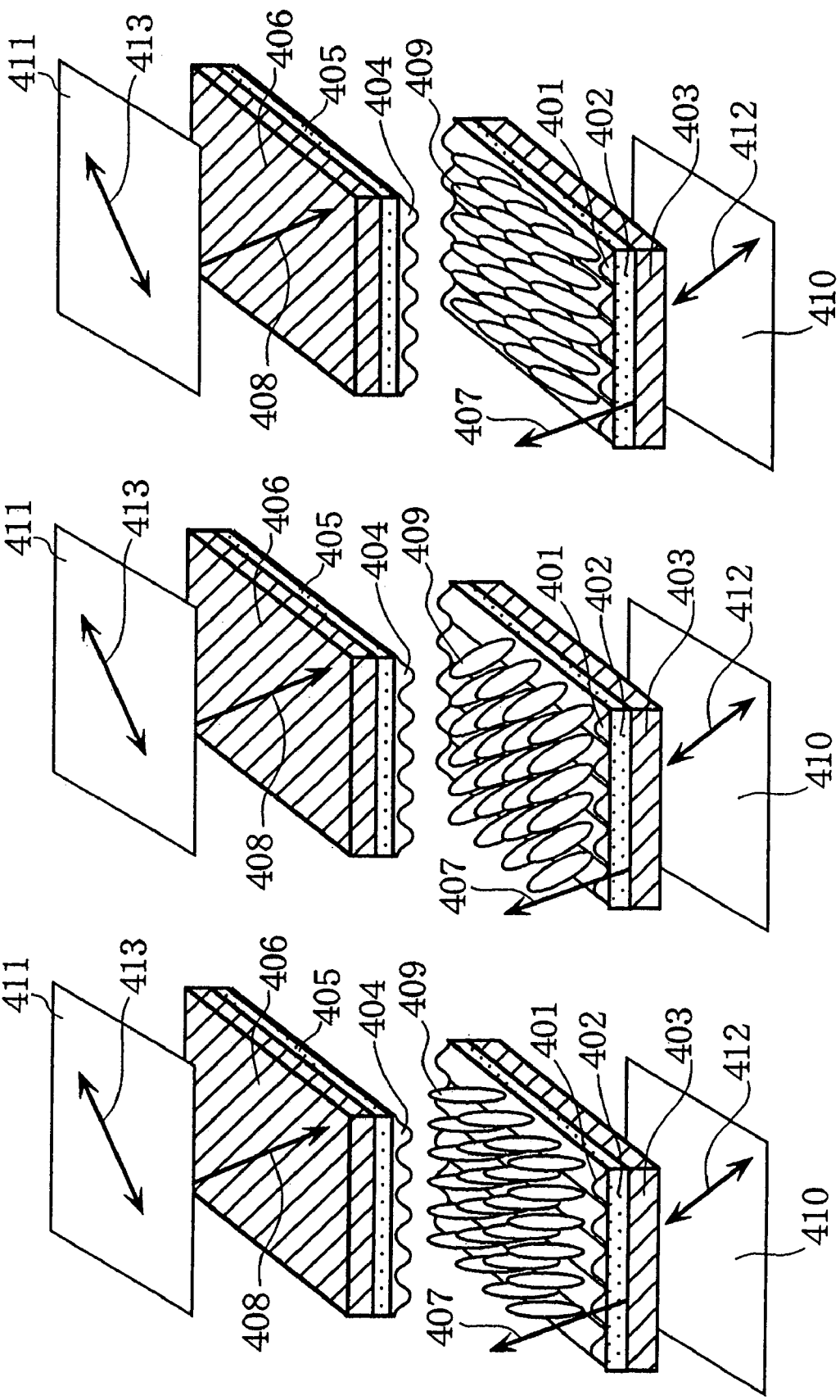

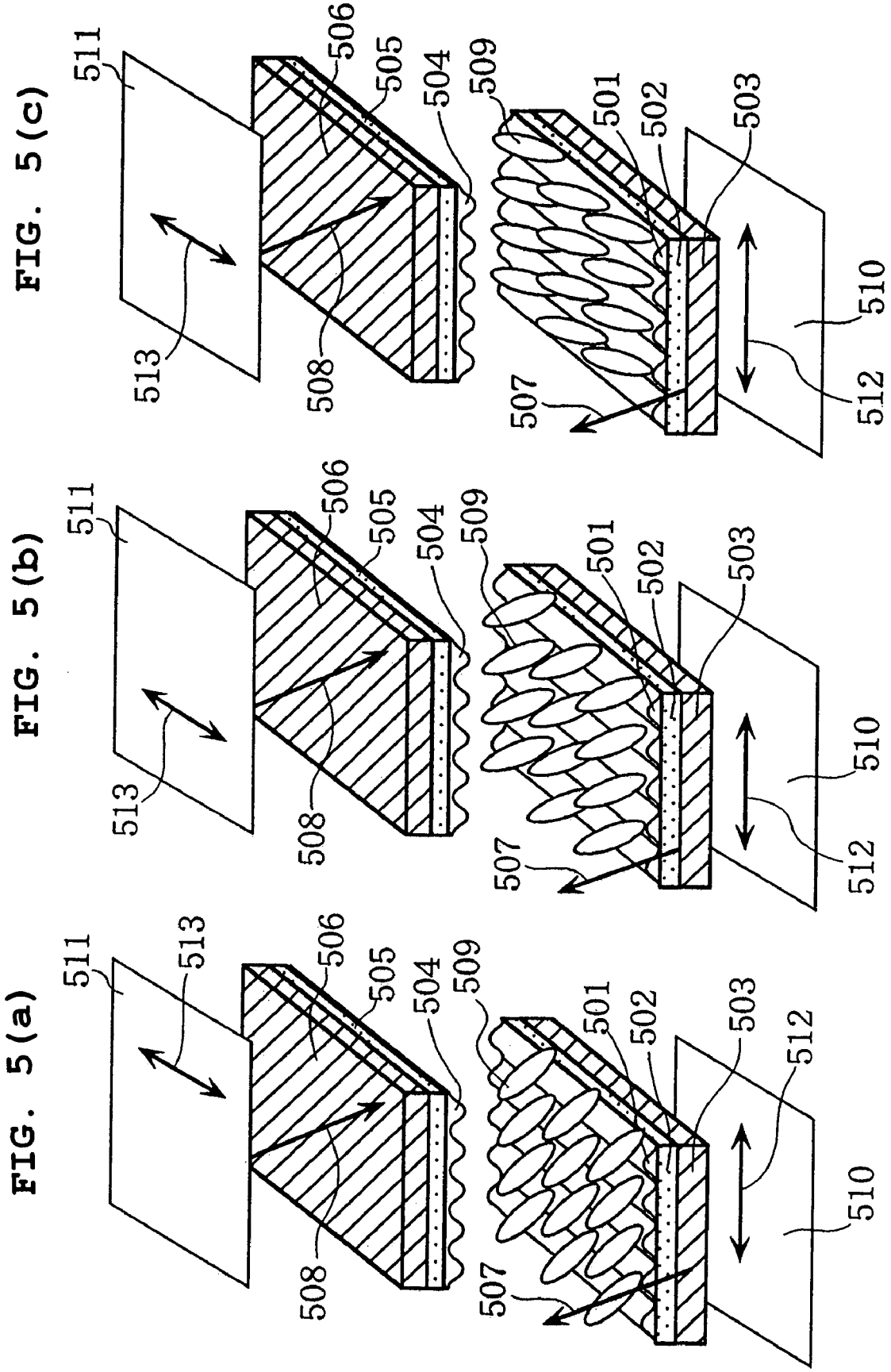

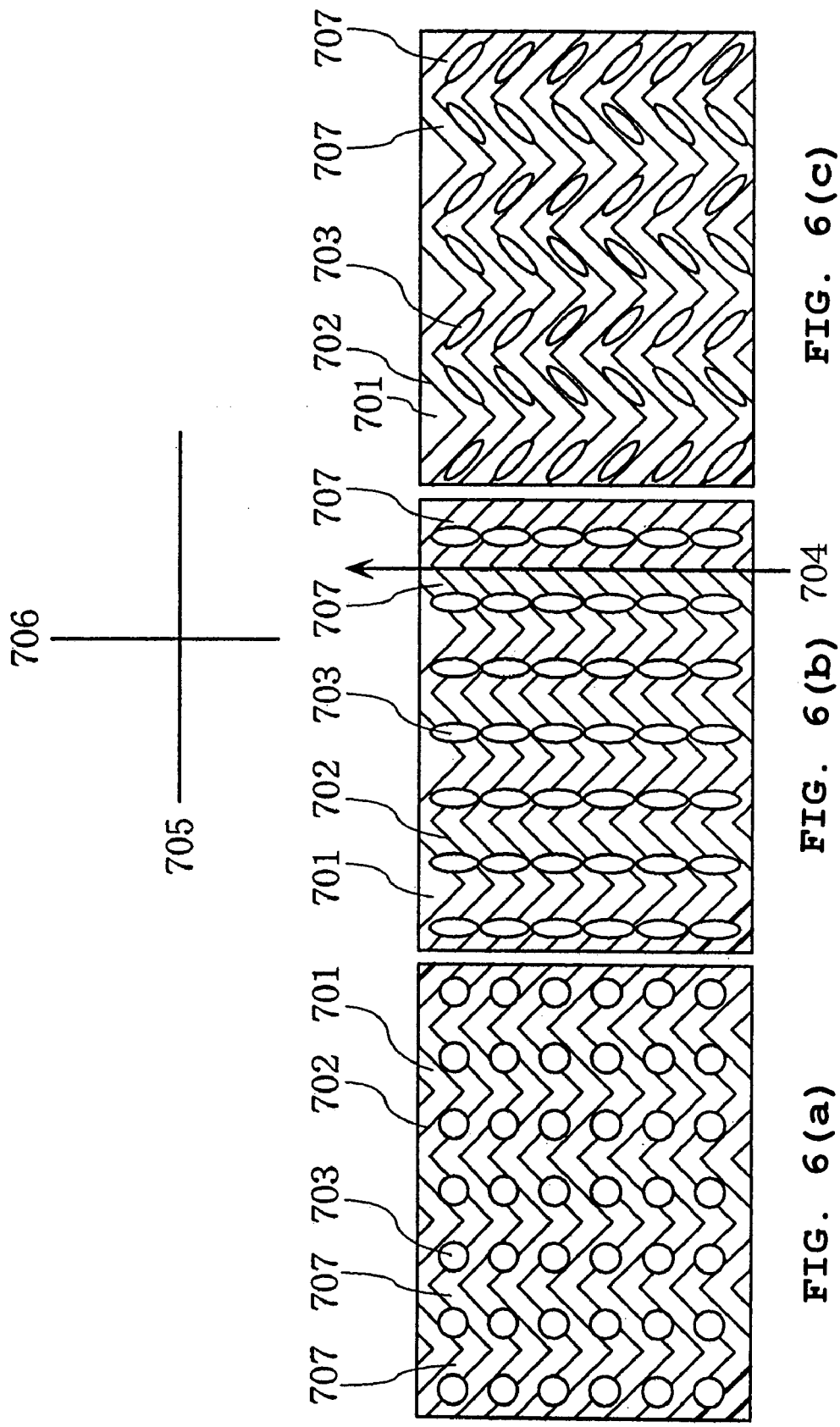

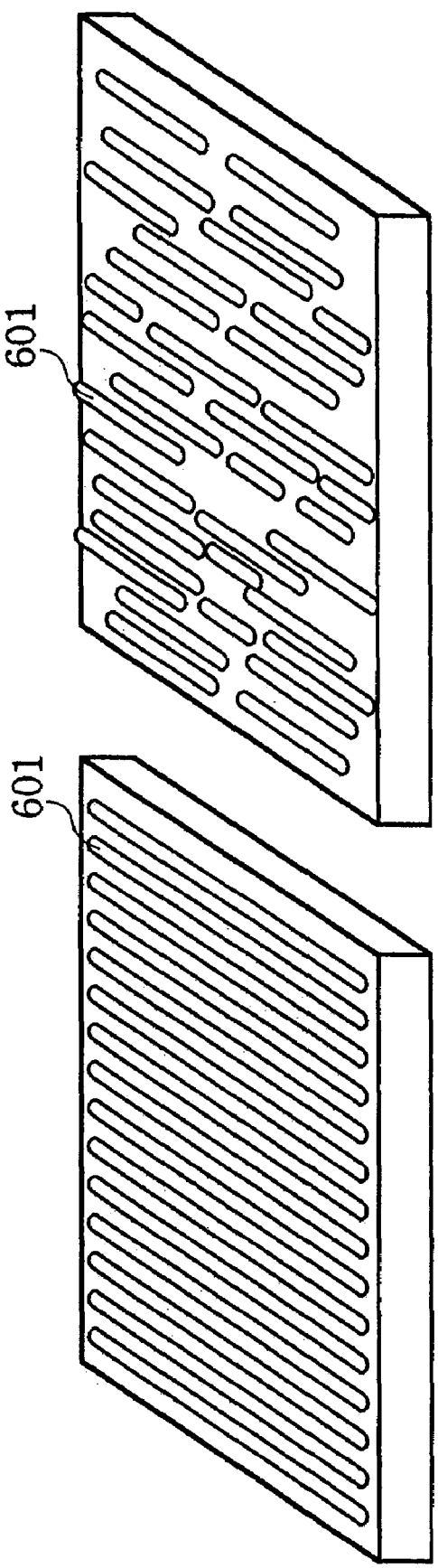

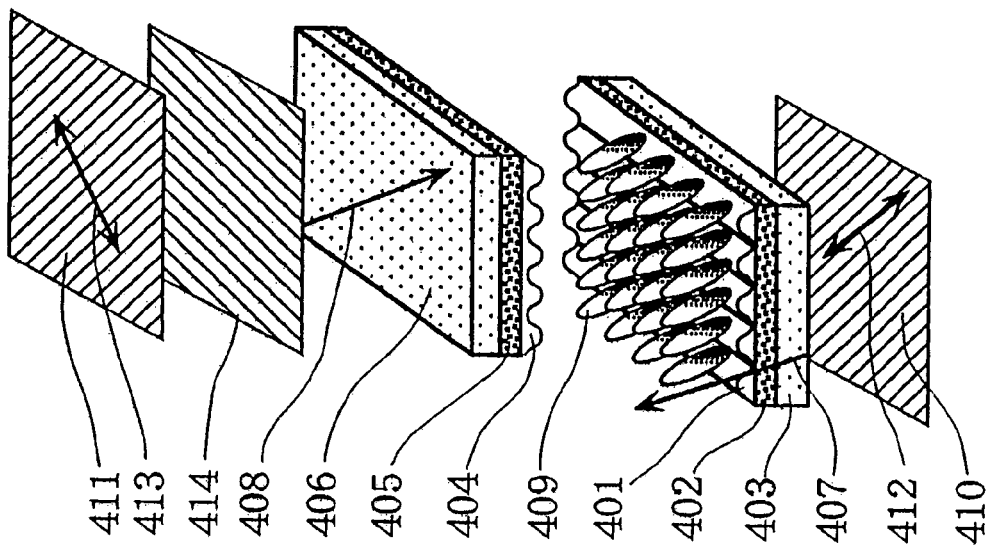
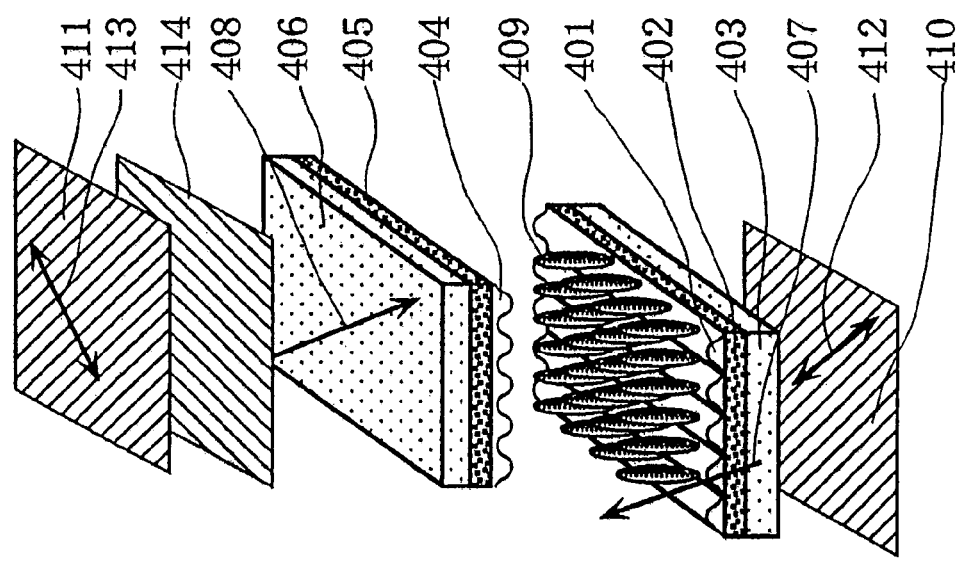

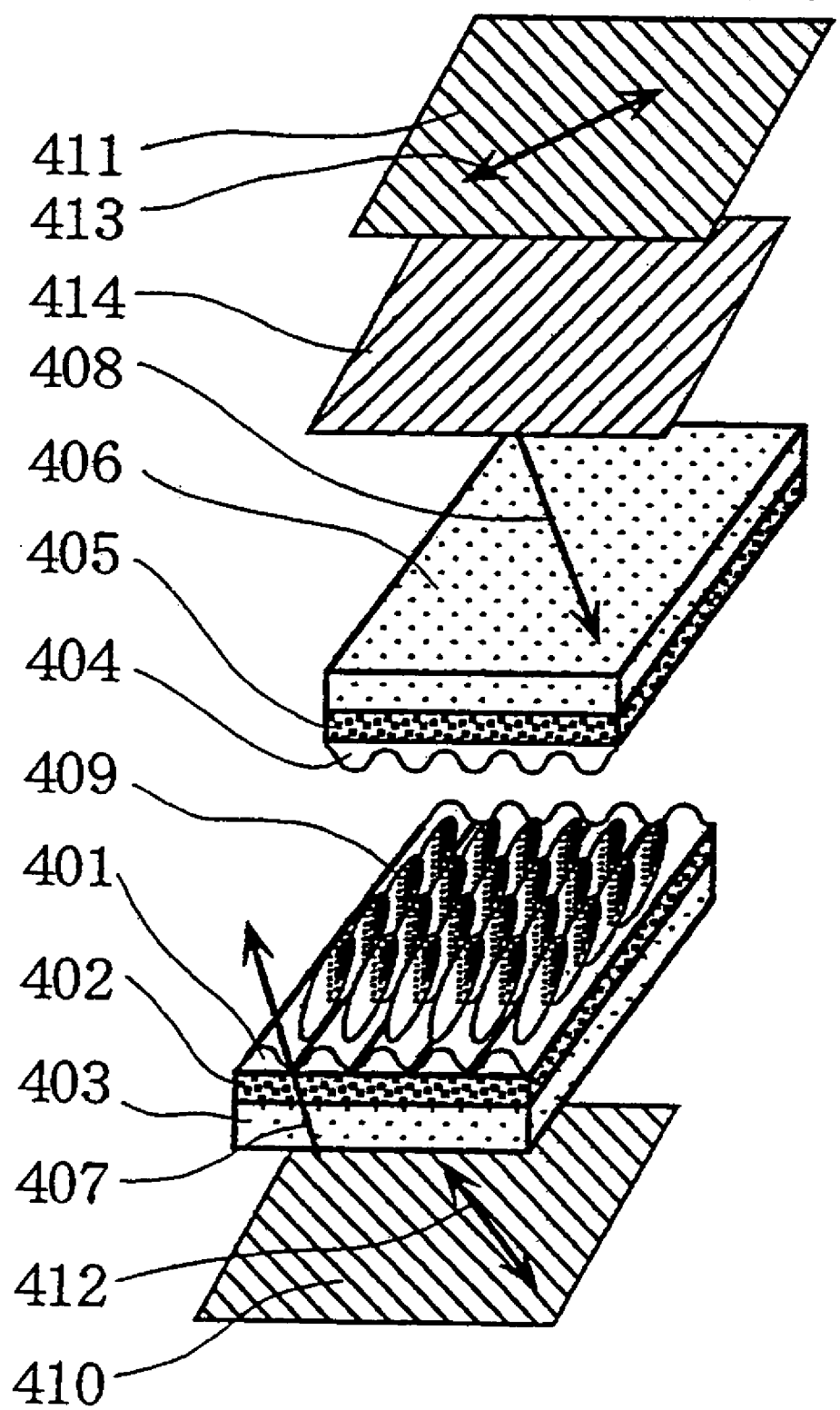

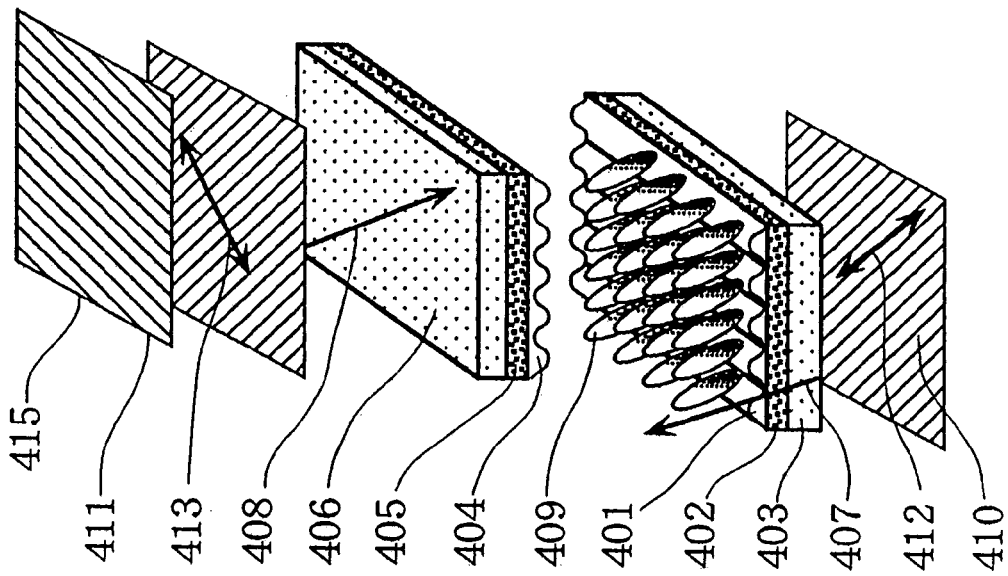
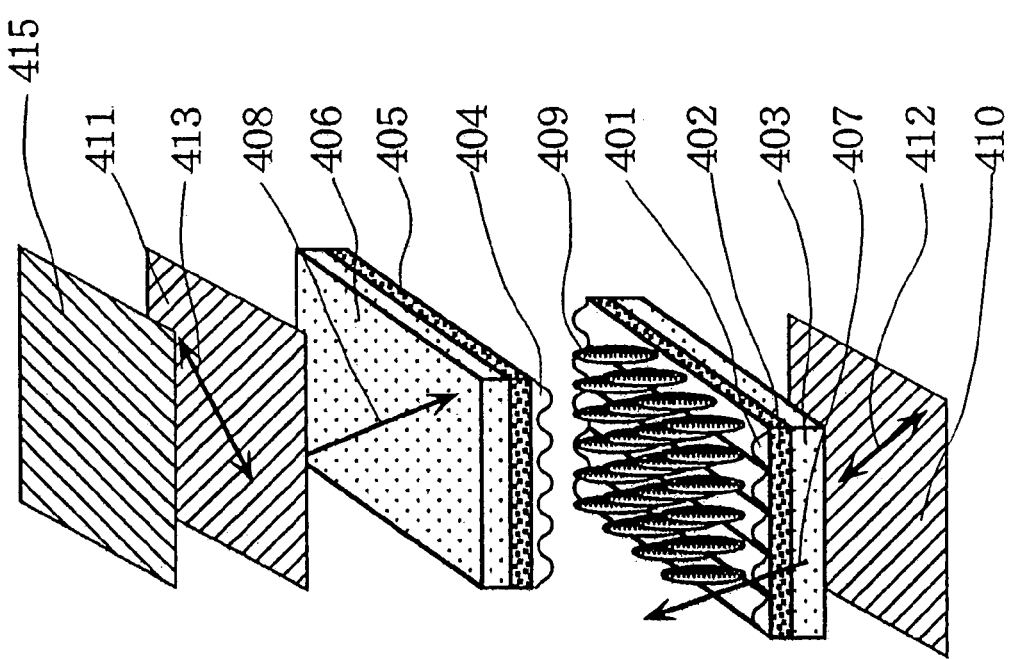

FIG. 15

LIQUID CRYSTAL DISPLAY WITH NONCONDUCTIVE PORTIONS IN SPECIFIC AREAS

This application is a Rule 1.53(b) divisional of application Ser. No. 09/450,415 filed Nov. 30, 1999, now U.S. Pat. No 6,690,440.

BACKGROUND OF THE INVENTION (1) Field of the Invention

The present invention relates to a liquid crystal element, and a manufacturing method and a driving method thereof.

(2) Description of the Prior Arts

A liquid crystal element is widely utilized for such a monitor and a projection type display as a word processor and a computer, and a small-sized portable television, and such an element for controlling light as an optical switching element. A conception of a liquid crystal element includes a liquid crystal display device and an optical switching element. A liquid crystal display device is described as a liquid crystal element unless mentioned particularly in the specification.

A twisted nematic (TN) liquid crystal and a vertically aligned (VA) liquid crystal are mentioned as a typical example of a liquid crystal used for a liquid crystal element.

A twisted nematic (TN) liquid crystal has a drawback of a low contrast because of an alignment directivity of a liquid crystal molecule near a reverse tilt domain and an interface. Moreover, in both a TN liquid crystal and a VA liquid crystal, light transmittance and reflectance vary greatly with an angle with a liquid crystal element because of the directivity of molecular array, and both liquid crystals have a characteristic of viewing angle whereby the coloring and the decrease of contrast are caused.

In order to correct the viewing angle, a retardation film and a scattering film are disposed on a surface of a liquid crystal element using a TN liquid crystal. Meanwhile, in recent years a method of dividing an alignment direction on a pixel into two or four parts is used for a VA liquid crystal in order to widen the viewing angle, however, the problem is that the utilization efficiency of light decreases and the response time of liquid crystal decreases, and additionally the process of dividing an alignment direction on a pixel and aligning a liquid crystal divisionally becomes complicated. It has been considered that a generally high contrast is obtained in a VA liquid crystal, however, a contrast on a supreme level can not obtained because of light leakage by a slight inclination of a liquid crystal molecule in a black display.

Thus, the problem is that conventional TN liquid crystal and VA liquid crystal have a great dependence on viewing angle, and the coloring, the decrease of contrast and tone reversal occurs according to a direction of viewing. Furthermore, the speed of response is unsatisfactory.

Recently, an in-plane switching (IPS) method, which is developed for improving a characteristic of viewing angle, is noticeable. Although the IPS has a superior characteristic of viewing angle because of driving a liquid crystal molecule on a substrate plane, an insulating layer on an electrode is necessary for preventing a short circuit between electrodes because of forming both electrodes on the same plane of the same substrate. The problem is that the IPS has an image persistence in displaying a fixed pattern for many hours because of the insulating layer.

A general liquid crystal element has a structure in which liquid crystal is sealed between two substrates. When an alignment direction of a liquid crystal molecule in liquid crystal becomes nonuniform in sealing liquid crystal between two substrates, irregularities occur in an alignment direction of a liquid crystal molecule of each pixel on an initial condition. Then, even if a voltage on the same condition is applied to each pixel, a disclination line appears nonuniformly at each pixel. When a display image is a black screen in using a liquid crystal element as a liquid crystal display device, an observer of the screen sees as if white sand would be scattered on the black screen and the screen were spotted.

In a homeotropic type liquid crystal display device (a liquid crystal element) wherein all liquid crystal molecules are aligned vertically to a substrate, a method of improving a display characteristic by providing an aperture for an opposite electrode and controlling electric field is disclosed in Japanese Unexamined Patent Publications No. 3-259121 and No. 6-301036.

The Publication No. 3-259121 relates to a dot matrix type liquid crystal display device, and as shown in FIG. 1, a slender aperture 51 is provided for a crossing portion of a first electrode (pixel electrode) 1 on the side of a TFT substrate and a second electrode (opposite electrode) 3 on the side of an opposite substrate, namely, the second electrode (opposite electrode) 3 in a display portion in a pixel.

Therefore, a diagonal electric field is caused in the crossing portion of the first electrode (pixel electrode) 1 and the second electrode (opposite electrode) 3, and as shown in FIG. 1(b), a liquid crystal molecule 7 is aligned uniformly in a predetermined direction by the diagonal electric field.

The Publication No. 6-301036 relates to an active matrix type liquid crystal display device, and an area, in which a liquid crystal molecule is not inclined remaining vertical, exists by providing an approximately square aperture for a central portion of an opposite electrode, which is opposite to a pixel electrode, namely, a display portion of a pixel, and forming an area with little or no electric field in the pixel electrode despite an existence (ON, OFF) of display. Therefore, the array of a liquid crystal molecule in other areas of the pixel is improved, a disclination line, which is a drawback resulting from the nonuniformity of array, is fixed, spots of the screen never occurs, the liquid crystal molecule is inclined in various directions (four directions) in a pixel, and thereby a characteristic of viewing angle is improved.

However, in either of these methods, since an aperture exists in an opposite electrode, opposite to a pixel electrode, namely, originally a display area, a disclination line always occurs in such a boundary between areas wherein a liquid crystal molecule is inclined in a different direction, and an area wherein a liquid crystal molecule is not inclined despite an existence of electric field as a central portion and a corner of the aperture. FIG. 1(c) shows this state in a liquid crystal display device of the above-mentioned Publication No. 3-259121. As shown in FIG. 1(c), a disclination line 9 occurs at both ends of the aperture 51.

Consequently, a liquid crystal display device (a liquid crystal element) having an aperture causes a remarkable decrease in light transmittance, such as a black portion in a white display.

Since an aperture exists in an opposite electrode in a pixel, which is originally a display portion, the resistance of light transmission increases. In addition, since an aperture which does not conduct electricity exists in an opposite electrode, a voltage in an opposite electrode away from a connection terminal portion decreases greatly, whereby the unevenness of luminance on a display plane occurs.

Accordingly, it has been desirable to actualize a liquid crystal display device wherein, by means of not causing a disclination line in a pixel display portion, a decrease in the utilization efficiency of light is never caused, the unevenness of luminance on a display plane never occurs, and the viewing angle toward up and down as well as right and left is improved.

SUMMARY OF THE INVENTION

The object of the present invention is to provide a liquid crystal element with a high contrast and a characteristic of a wide viewing angle, wherein a liquid crystal molecule responses at a high speed, and a manufacturing method thereof. The first group of inventions for achieving the object relates to a liquid crystal element characteristic of the motion of a liquid crystal molecule, and a manufacturing method and a driving method thereof. The second group of inventions for achieving the same object relates to a liquid crystal element characteristic of the shape of an opposite electrode.

A liquid crystal element in the first group of inventions is characterized of comprising a liquid crystal molecule which moves in two or more directions phasedly or gradually by applying voltage.

Since a liquid crystal molecule moves in two different directions, the transmittance and cutoff of incident light can be controlled, and the switching is executed on a plane in a liquid crystal element in the first group of inventions like IPS mode. Therefore, a characteristic of a wide viewing angle is obtained.

Another liquid crystal element in the first group of inventions is characterized of comprising a liquid crystal having a liquid crystal molecule, and two substrates holding the liquid crystal; and in that an information for aligning a liquid crystal molecule in two or more directions phasedly or gradually by applying voltage is provided for the above-mentioned two substrates.

Another liquid crystal element in the first group of inventions is characterized of comprising a liquid crystal having a liquid crystal molecule, and two substrates holding the liquid crystal; and in that an information for aligning a liquid crystal molecule in two or more directions phasedly or gradually by applying voltage is provided for only one of the above-mentioned two substrates.

A dielectric anisotropy of a liquid crystal used for the above-mentioned liquid crystal element can be made negative. It is preferable that, in a liquid crystal element having a liquid crystal with a negative dielectric anisotropy, the liquid crystal molecule contacts with a surface of either or both of the above-mentioned two substrates at an angle of 80 to 90°. That is, the utilization efficiency of light can be raised by a vertically aligned (VA) cell.

A dielectric anisotropy of a liquid crystal used for the above-mentioned liquid crystal element can be made positive. It is preferable that, in a liquid crystal element having a liquid crystal with a positive dielectric anisotropy, the liquid crystal molecule contacts with a surface of either or both of the above-mentioned two substrates at an angle of 0 to 10°. The utilization efficiency of light can be raised more by a horizontal alignment, in which the liquid crystal molecule contacts with a surface of both of the above-mentioned two substrates at an angle of 0 to 10°, than by a hybrid alignment.

As regards the above-mentioned information for aligning, whether a dielectric anisotropy of a liquid crystal is negative or positive, a first information for aligning is provided for only one of the substrates at an angle of approximately 0° or 45° with a transmission axis or an absorption axis of a polarizer, and additionally, a second information for aligning is provided for the same substrate at an angle of 45° with the above-mentioned first information for aligning. According to these two information for aligning, a high contrast and a wide viewing angle are obtained by changing an alignment direction of a liquid crystal element under an application of voltage.

When the first and second information for aligning is provided not merely for only one of the substrates but also for the two substrates, a higher contrast and a wider viewing angle are obtained because of a stronger control of alignment. Then, it is desirable that a first information for aligning on a substrate is parallel or antiparallel with a first information for aligning on the other substrate, and a second information for aligning on a substrate is parallel or antiparallel with a second information for aligning on the other substrate.

For instance, in a VA liquid crystal mode wherein a liquid crystal molecule is aligned approximately vertically to both substrates, a liquid crystal molecule is aligned approximately vertically to both substrates under no application of voltage, and simultaneously is inclined a little in a direction of the first information for aligning. Then, it is desirable that a direction in which a liquid crystal molecule is inclined is a direction of a transmission axis or an absorption axis of a polarizer when a liquid crystal molecule is projected orthogonally onto a polarizer.

Next, a liquid crystal molecule is inclined further by applying voltage, and at some moment, the control of alignment of a liquid crystal molecule shifts from the first information for aligning to the second information for aligning gradually or phasedly, and a direction of an orthogonal projection of a liquid crystal molecule onto a polarizer shifts gradually from the first information for aligning to the second information for aligning (a direction of an angle of approximately 45° with the first information for aligning). Then, a direction of an orthogonal projection of a liquid crystal molecule onto a polarizer shifts from a direction of a transmission axis or an absorption axis of a polarizer to a direction of an angle of 45° with a transmission axis or an absorption axis of a polarizer. Thus, a light, which is cut off and is not emitted by a polarizer under no application of voltage, is emitted under an application of voltage by disposing a polarizer on the outside (an incident light side and an emitted light side) of a substrate so that its transmission axis crosses each other at right angles.

Because of optical control wherein a liquid crystal molecule moves on a substrate plane, a characteristic of viewing angle is greatly superior to optical control wherein a liquid crystal molecule moves in a vertical direction to a substrate plane, such as an ordinary twisted nematic mode. Under no application of voltage (black display), since a direction of an orthogonal projection of a liquid crystal molecule onto a polarizer is a direction of a transmission axis or an absorption axis of a polarizer, a characteristic of contrast of a polarizer itself is obtained.

A liquid crystal used for a liquid crystal element in the present invention may have spontaneous polarization. A ferroelectric liquid crystal and an antiferroelectric liquid crystal are mentioned as a liquid crystal having spontaneous polarization.

It is preferable that the above-mentioned first and second information for aligning, which is provided for a substrate of a liquid crystal element in the present invention, is formed in a different method.

For instance, it is preferable that the above-mentioned first information for aligning is irregularities formed on a surface of one or both of the substrates. It is preferable that a shape (pitch, height and the like) of the irregularities on a substrate is different from the other substrate in the case of forming the above-mentioned first information for aligning on a surface of both of the substrates. The irregularities with arbitrary length, width and pitch may be arrayed in a direction or the irregularities with a uniform pitch may be formed in a stripe. It is preferable that the pitch is 2 μm or less and a ratio of the height to the pitch is 0.01 to 10. A liquid crystal molecule for which an information for aligning is provided by such irregularities is easily aligned.

It is preferable that the above-mentioned second information for aligning is formed by rubbing, irradiation of ultraviolet rays and a slit for causing a lateral electric field which is provided for an electrode.

It is preferable to use a thin film transistor (TFT) and a metal-insulator-metal (MIM) as a driving element of a liquid crystal element in the first group of inventions.

It is possible to employ a stripe electrode for a simple matrix, a transparent electrode like ITO, and a reflective electrode composed of a substance with a high reflectivity like aluminum (Al) and silver (Ag) as an electrode of a liquid crystal element in the first group of inventions.

It is preferable that irregularities on a substrate of a liquid crystal element in the first group of inventions are composed of a flat electrode formed on a substrate, an insulating layer in a concavo-convex shape laminated on the above-mentioned electrode, a thin conductive layer laminated on the above-mentioned insulating layer, and a conductive continuity portion connecting the above-mentioned electrode and conductive layer The above-mentioned irregularities may have a microarea in a direction wherein a liquid crystal molecule is aligned. It is preferable that the microarea is aligned in two or more different directions and the directions cross each other at right angles. A viewing angle is improved further by aligning a liquid crystal molecule in two or more directions phasedly or gradually and aligning a liquid crystal molecule in different directions in each microarea.

A method of manufacturing a liquid crystal element in the first group of inventions is characterized of comprising a step of providing an information for aligning a liquid crystal molecule in a direction for a substrate with an electrode by applying voltage.

It is preferable that the above-mentioned step comprises a first step of providing an information for aligning a liquid crystal molecule in a direction for two substrates holding a liquid crystal having the liquid crystal molecule by applying voltage, and a second step of providing an information for aligning the liquid crystal molecule in a different direction from the above-mentioned direction phasedly or gradually for the above-mentioned substrates.

An information for aligning is provided for a substrate by providing irregularities on a surface of the substrate in at least one of the first step and the second step. A method of patterning with photosensitive resin is the easiest as a method of forming irregularities; either of the patterning with a photomask, the patterning with interferential fringes of laser, the patterning with a electron beam, and the patterning with a laser ablation may be used. Then, it is preferable that photosensitive resin is conductive. As another method of forming irregularities, the irregularities may be formed in a direction by coating an inorganic substance or an organic substance on a substrate; and adding a physical contact like extension, scratch and rub. Then, it is not necessary that the irregularities are arrayed regularly in a stripe. It is preferable that the coating of an inorganic substance or an organic substance is conductive.

As another method of forming irregularities, the irregularities may be added on a surface of a substrate by forming a pattern of irregularities on another substrate beforehand and transferring it. It is possible to transfer by rolling with a roll coater or to transfer by sticking with a flat plate. It is not necessary to transfer the whole substrate at a time, and the irregularities may be added on the whole substrate by dividing into small areas and transferring several times.

An information for aligning can be provided for a substrate by irradiating ultraviolet rays in at least one of the first step and the second step. Either of a linearly polarized light or not may be used as ultraviolet rays, and a linearly polarized light is preferable and additionally it is possible to irradiate at an angle with a substrate. If chemical bond reactive by ultraviolet rays exists on a surface of a substrate before irradiating, an information for aligning is provided easily because of the occurrence of bond and decomposition by irradiating ultraviolet rays. An alignment layer such as polyimide and siloxane available on public sale is used most easily.

A rubbing treatment can be executed on a substrate in at least one of the first step and the second step. Any cloth is used for rubbing, and rayon and cotton are general.

Another liquid crystal element in the first group of inventions is characterized of comprising at least one polarizer in addition to the above-mentioned liquid crystal element. Such polarizer is a film using resin like iodine and dyestuff, and a plate for polarizing light of Glan-Thomson prism utilizing crystal plane. It is possible to add a retardation plate and a scattering plate to the liquid crystal element and to widen a viewing angle.

Another liquid crystal element in the first group of inventions is characterized of comprising at least one polarized beam splitter in addition to the above-mentioned liquid crystal element. It is possible to add a retardation plate and a scattering plate to the liquid crystal element and to widen a viewing angle.

Furthermore, a liquid crystal element in the first group of inventions can be used as an optical switching element.

A method of driving a liquid crystal element in the first group of inventions is characterized of driving by applying a voltage above a higher appropriate voltage than a threshold voltage of a liquid crystal. A threshold voltage of a liquid crystal is a voltage at the moment when a liquid crystal moves by the voltage.

According to the first group of inventions, such an effect is obtained that a liquid crystal element with a high contrast, a wide viewing angle and a high-speed response can be provided by aligning a liquid crystal molecule in two or more directions phasedly under an application of voltage, and thereby all problems in conventional TN, VA and IPA modes can be solved.

The second group of inventions relates to a fully devised opposite electrode. More specifically, the constitutions are described below.

A liquid crystal element in the first mode in the second group of inventions is characterized of comprising a multitude of pixel electrodes which are divided minutely, and a liquid crystal to which an electric field is applied by the above-mentioned pixel electrodes; and in that an electric field direction of the liquid crystal between at least one pair of adjacent pixels is inclined against an electrode plane.

A liquid crystal element in the second mode in the second group of inventions is characterized of comprising a multitude of pixel electrodes which are divided minutely, an opposite electrode which is disposed in parallel with the above-mentioned pixel electrodes, and a liquid crystal which is held between the above-mentioned pixel electrode and opposite electrode; and in that a nonconductive portion is provided in a part of the opposite electrode which is opposite to a gap between at least one pair of adjacent pixel electrodes.

A liquid crystal element, wherein a four-sided minute pixel electrode is arrayed in a lattice in X, Y directions crossing each other at right angles on a display plane, in the third mode in the second group of inventions is characterized of comprising, in view of Z direction at right angles with X, Y directions when a pixel of i-th position in X direction and j-th position in Y direction from an edge point or a standard point is defined as p (i, j), a first nonconductive portion, with a rectangular shape having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1); a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3); a third nonconductive portion, with a rectangular shape having a longer side in X direction and a larger width in Y direction than a distance between a pixel p (4m+2, 4n) and a pixel p (4m+2, 4n+1), which includes an opposite electrode corresponding to each of at least a part of a gap between a pixel p (4m+2, 4n) and a pixel p (4m+2, 4n+1) as well as at least a part of a gap between a pixel p (4m+3, 4n) and a pixel p (4m+3, 4n+1); and a fourth nonconductive portion, with a rectangular shape having a longer side in Y direction and a larger width in X direction than a distance between a pixel p (4m+2, 4n+3) and a pixel p (4m+3, 4n+3), which includes an opposite electrode corresponding to each of at least a part of a gap between a pixel p (4m+2, 4n+2) and a pixel p (4m+3, 4n+2) as well as at least a part of a gap between a pixel p (4m+2, 4n+3) and a pixel p (4m+3, 4n+3).

Then, a minute pixel, which is employed on a display plane of a liquid crystal television set and a word processor, means that a person can not observe black and white (ON and OFF) of each liquid crystal element. The minute pixel is approximately 500 μm (a large size) or less in a side, particularly 100 μm or less, and desirably approximately 6 to 30 μm.

According to the above-mentioned constitution, the following function is obtained in a liquid crystal display device wherein a pixel electrode and an opposite electrode are a four-sided figure suitable for disposition and manufacturing, and a minute pixel is arrayed in a lattice in X, Y directions crossing each other at right angles on a display plane.

In view of Z direction at right angles with X, Y directions when a pixel of i-th position in X direction and j-th position in Y direction from such an edge point or a standard point as the bottom and left in a pixel group is defined as p (i, j), a first nonconductive portion, with a rectangular shape (including a somewhat different case like four round corners due to manufacturing) having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1) is provided.

Likewise, a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3) is provided.

Accordingly, in view of Z direction, an opposite electrode corresponding to a pixel electrode does not exist in a portion which includes each of at least a part of a gap as well as at least a part of the other gap.

Likewise, a third nonconductive portion, with a rectangular shape having a longer side in X direction and a larger width in Y direction than a distance between a pixel p (4m+2, 4n) and a pixel p (4m+2, 4n+1), which includes an opposite electrode corresponding to each of at least a part of a gap between a pixel p (4m+2, 4n) and a pixel p (4m+2, 4n+1) as well as at least a part of a gap between a pixel p (4m+3, 4n) and a pixel p (4m+3, 4n+1) is provided.

Likewise, a fourth nonconductive portion, with a rectangular shape having a longer side in Y direction and a larger width in X direction than a distance between a pixel p (4m+2, 4n+3) and a pixel p (4m+3, 4n+3), which includes an opposite electrode corresponding to each of at least a part of a gap between a pixel p (4m+2, 4n+2) and a pixel p (4m+3, 4n+2) as well as at least a part of a gap between a pixel p (4m+2, 4n+3) and a pixel p (4m+3, 4n+3) is provided.

Consequently, four nonconductive portions in total are provided on the side of the opposite electrode as a unit of 4×4 pixels (in the case of black and white display). Each pixel is opposite to a nonconductive portion on only one side. Then, each nonconductive portion is arrayed vertically by turns in view of either of X, Y directions. In addition, a pair of adjacent pixels are opposite to a nonconductive portion.

Consequently, an alignment of a liquid crystal molecule is not irregular in a display area of a pixel, and the problem of an increase in a resistance of the opposite electrode never occurs.

As a result, a superior liquid crystal display device is obtained.

A liquid crystal element, wherein a four-sided minute pixel electrode is arrayed in a lattice in X, Y directions crossing each other at right angles on a display plane, in the fourth mode in the second group of inventions is characterized of comprising, in view of Z direction at right angles with X, Y directions when a pixel of i-th position in X direction and j-th position in Y direction from an edge point or a standard point is defined as p (i, j), a first nonconductive portion, with a rectangular shape having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1); a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3); a third nonconductive portion, with a rectangular shape having a longer side in X direction and a larger width in Y direction than a distance between a pixel p (4m+3, 4n+3) and a pixel p (4m+3, 4n+4), which includes an opposite electrode corresponding to each of at least a part of a gap between a pixel p (4m+2, 4n+3) and a pixel p (4m+2, 4n+4) as well as at least a part of a gap between a pixel p (4m+3, 4n+3) and a pixel p (4m+3, 4n+4); and a fourth nonconductive portion, with a rectangular shape having a longer side in Y direction and a larger width in X direction than a distance between a pixel p (4m+2, 4n+2) and a pixel p (4m+3, 4n+2), which includes an opposite electrode corresponding to each of at least a part of a gap between a pixel p (4m+2, 4n+1) and a pixel p (4m+3, 4n+1) as well as at least a part of a gap between a pixel p (4m+2, 4n+2) and a pixel p (4m+3, 4n+2).

According to the above-mentioned constitution, the following function is obtained in a liquid crystal display device wherein a pixel electrode and an opposite electrode are a four-sided figure (including the case of several irregularities due to manufacturing), and a minute pixel is arrayed in a lattice in X, Y directions crossing each other at right angles on a display plane.

In view of Z direction at right angles with X, Y directions when a pixel of i-th position in X direction and j-th position in Y direction from an edge point or a standard point is defined as p (i, j), a first nonconductive portion, with a rectangular shape having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1) is provided.

Likewise, a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3) is provided.

Likewise, a third nonconductive portion, with a rectangular shape having a longer side in X direction and a larger width in Y direction than a distance between a pixel p (4m+3, 4n+3) and a pixel p (4m+3, 4n+4), which includes an opposite electrode corresponding to each of at least a part of a gap between a pixel p (4m+2, 4n+3) and a pixel p (4m+2, 4n+4) as well as at least a part of a gap between a pixel p (4m+3, 4n+3) and a pixel p (4m+3, 4n+4) is provided.

Likewise, a fourth nonconductive portion, with a rectangular shape having a longer side in Y direction and a larger width in X direction than a distance between a pixel p (4m+2, 4n+2) and a pixel p (4m+3, 4n+2), which includes an opposite electrode corresponding to each of at least a part of a gap between a pixel p (4m+2, 4n+1) and a pixel p (4m+3, 4n+1) as well as at least a part of a gap between a pixel p (4m+2, 4n+2) and a pixel p (4m+3, 4n+2) is provided.

According to the above, the same function and effect as a liquid crystal element in the third mode in the second group of inventions is obtained as a whole and virtually aside from a side of top and bottom as well as right and left on a display plane in a liquid crystal element in the fourth mode in the second group of inventions.

A liquid crystal element, wherein a four-sided minute pixel electrode is arrayed in a lattice X, Y direction crossing each other at right angles on a display plane, in the fifth mode in the second group of inventions is characterized of comprising, in view of Z direction at right angles with X, Y directions when a pixel of i-th position in X direction and j-th position in Y direction from an edge point or a standard point is defined as p (i, j), a first nonconductive portion, with a rectangular shape having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1); a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3); a third nonconductive portion, with a rectangular shape having a longer side in X direction and a larger width in Y direction than a distance between a pixel p (4m+3, 4n+1) and a pixel p (4m+3, 4n+2), which includes an opposite electrode corresponding to each of at least a part of a gap between a pixel p (4m+2, 4n+1) and a pixel p (4m+2, 4n+2) as well as at least a part of a gap between a pixel p (4m+3, 4n+1) and a pixel p (4m+3, 4n+2); and a fourth nonconductive portion, with a rectangular shape having a longer side in Y direction and a larger width in X direction than a distance between a pixel p (4m+2, 4n) and a pixel p (4m+3, 4n), which includes an opposite electrode corresponding to each of at least a part of a gap between a pixel p (4m+2, 4n−1) and a pixel p (4m+3, 4n−1) as well as at least a part of a gap between a pixel p (4m+2, 4n) and a pixel p (4m+3, 4n).

According to the above-mentioned constitution, the following function is obtained in a liquid crystal display device wherein a pixel electrode and an opposite electrode are a four-sided figure, and a minute pixel is arrayed in a lattice in X, Y directions crossing each other at right angles on a display plane.

In view of Z direction at right angles with X, Y directions when a pixel of i-th position in X direction and j-th position in Y direction from an edge point or a standard point is defined as p (i, j), a first nonconductive portion, with a rectangular shape having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1) is provided.

Likewise, a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3) is provided.

Likewise, a third nonconductive portion, with a rectangular shape having a longer side in X direction and a larger width in Y direction than a distance between a pixel p (4m+3, 4n+1) and a pixel p (4m+3, 4n+2), which includes an opposite electrode corresponding to each of at least a part of a gap between a pixel p (4m+2, 4n+1) and a pixel p (4m+2, 4n+2) as well as at least a part of a gap between a pixel p (4m+3, 4n+1) and a pixel p (4m+3, 4n+2) is provided.

Likewise, a fourth nonconductive portion, with a rectangular shape having a longer side in Y direction and a larger width in X direction than a distance between a pixel p (4m+2, 4n) and a pixel p (4m+3, 4n), which includes an opposite electrode corresponding to each of at least a part of a gap between a pixel p (4m+2, 4n−1) and a pixel p (4m+3, 4n−1) as well as at least a part of a gap between a pixel p (4m+2, 4n) and a pixel p (4m+3, 4n) is provided.

In the end, the virtually same function and effect as a liquid crystal element in the third and fourth modes in the second group of inventions is obtained in a liquid crystal element in the fifth mode in the second group of inventions.

A liquid crystal element in the sixth mode in the second group of inventions is characterized of being a liquid crystal element according to any one of the above-mentioned third to fifth modes; and in that the above-mentioned four-sided minute pixel electrode is rectangular in its plane shape, and an area in which each of first to fourth nonconductive portions with a rectangular shape, which include the above-mentioned opposite electrode, overlaps with the above-mentioned rectangular pixel electrode has a narrower width in a direction of a longer side of the pixel electrode than a width in a direction of a shorter side of the pixel electrode, in view of Z direction.

According to the above-mentioned constitution, the following function is obtained.

A plane shape of the pixel electrode is occasionally rectangular due to manufacturing and standard of a display plane. A direction of a longer side of the rectangular pixel electrode is different in a range affected by the nonconductive portion from a direction of a shorter side. A range of the influence of the nonconductive portion on molecular array can be equalized by narrowing a width in a direction of a longer side as compared with a width in a direction of a shorter side.

A liquid crystal element in the seventh mode in the second group of inventions is characterized of being a liquid crystal element according to any one of the above-mentioned third to fifth modes; and in that the above-mentioned four-sided minute pixel electrode is square in its plane shape.

According to the above-mentioned constitution, the following function is obtained.

The four-sided minute pixel electrode is square in its plane shape. Consequently, the pixel electrode is arrayed in a lattice on a display plane.

A liquid crystal element in the eighth mode in the second group of inventions is characterized of being a liquid crystal element according to any one of the above-mentioned third to seventh modes; and in that the above-mentioned four-sided minute pixel electrode is a pixel electrode for a color display wherein a pixel for three primary colors is arrayed in a mosaic.

These three primary colors are red, green and blue; or cyan, magenta and yellow.

According to the above-mentioned constitution, the following function is obtained.

An alignment does not exist in each color as a set of 96 pixels, and a fine image is obtained.

A liquid crystal element in the ninth mode in the second group of inventions is characterized of being a liquid crystal element according to any one of the above-mentioned sixth or seventh mode; and in that the above-mentioned four-sided minute pixel electrode is composed of three four-sided minor pixel electrodes for three primary colors, which are arrayed vertically to a direction of a longer side of the above-mentioned first to fourth nonconductive portions with a rectangular shape.

According to the above-mentioned constitution, the following function is obtained.

The crystal element is used for a color display, and thereby a four-sided minute pixel electrode is composed of three minor pixel electrodes for three primary colors, which are arrayed vertically to a direction of a longer side of an area, opposite to the corresponding pixel electrode, of first to fourth nonconductive portions with a rectangular shape.

A liquid crystal element in the tenth mode in the second group of inventions is characterized of being a liquid crystal element according to any one of the above-mentioned third to ninth modes; and in that the above-mentioned nonconductive portion with a rectangular shape is a nonconductive portion with a lap of 2 μm wherein a width of its shorter side is larger by 4 μm or more than a gap between two opposite pixels through its longer side.

According to the above-mentioned constitution, the following function is obtained.

The nonconductive portion with a rectangular shape is opposite with a width of at least 2 μm to a pixel (electrode), in view of Z direction. Consequently, the array of molecule is affected greatly depending on a gap between substrates (electrodes) and the size of a pixel, and its forming is easy whether dry-etching or wet-etching.

A liquid crystal element in the eleventh mode in the second group of inventions is characterized of being a liquid crystal element according to any one of the above-mentioned third to tenth modes; and comprising a group of minor nonconductive portions which include an opposite electrode corresponding to at least a part of a gap between two opposite pixel electrodes or minor (sub) pixel electrodes through two longer sides of the nonconductive portion, instead of at least one (all in principle) of the above-mentioned first to fourth nonconductive portions.

According to the above-mentioned constitution, the following function is obtained.

Depending on the size of a display plane and a pixel, a group of minor nonconductive portions include an opposite electrode corresponding to at least a part of a gap between two opposite pixels or minor pixels through two longer side of the nonconductive portion, instead of at least one of the sizable first to fourth nonconductive portions.

Consequently, a decrease in voltage of the opposite electrode is reduced.

A liquid crystal element, wherein a four-sided minute pixel electrode is arrayed in a delta system for a color display on a display plane, in the twelfth mode in the second group of inventions is characterized of comprising, when a pixel row of i-th position from a bottom side upward is defined as q(i) and a group of three adjacent pixels of red, green and blue, which is composed of one of red, green and blue pixels in an odd pixel row q(2m+1) [m: an integer] and one of red, green and blue pixels in an even pixel row q(2m+2), is defined as a group of pixels for a color display and a group of pixels for a color display of j-th position from a left side on q(2m+1) and q(2m+2) is defined as Gq(j), a first T-shaped nonconductive portion which includes an opposite electrode corresponding to each of at least a part of a gap between two adjacent pixels on q(2m+1) in a group of pixels for a color display composed of two pixels on q(2m+1) and a pixel on q(2m+2) as well as at least a part of a pixel on q(2m+2) facing the above-mentioned two pixels on q(2m+1); a first reverse T-shaped nonconductive portion adjacent to the above-mentioned first T-shaped nonconductive portion, which includes an opposite electrode corresponding to each of at least a part of a gap between two adjacent pixels on q(2m+2) in a group of pixels for a color display composed of a pixel on q(2m+1) and two pixels on q(2m+2) as well as at least a part of a pixel on q(2m+1) facing the above-mentioned two pixels on q(2m+2); a second T-shaped nonconductive portion shifted leftward by a pixel from the above-mentioned first T-shaped nonconductive portion, which includes an opposite electrode corresponding to each of at least a part of a gap between two adjacent pixels on q(2m+3) in a group of pixels for a color display composed of two pixels on q(2m+3) and a pixel on q(2m+4) as well as at least a part of a pixel on q(2m+4) facing the above-mentioned two pixels on q(2m+3); a second reverse T-shaped nonconductive portion adjacent to the above-mentioned second T-shaped nonconductive portion, which includes an opposite electrode corresponding to each of at least a part of a gap between two adjacent pixels on q(2m+4) in a group of pixels for a color display composed of a pixel on q(2m+3) and two pixels on q(2m+4) as well as at least a part of a pixel on q(2m+3) facing the above-mentioned two pixels on q(2m+4); a third T-shaped nonconductive portion shifted leftward by a pixel from the above-mentioned second T-shaped nonconductive portion, which includes an opposite electrode corresponding to each of at least a part of a gap between two adjacent pixels on q(2m+5) in a group of pixels for a color display composed of two pixels on q(2m+5) and a pixel on q(2m+6) as well as at least a part of a pixel on q(2m+6) facing the above-mentioned two pixels on q(2m+5); and a third reverse T-shaped nonconductive portion adjacent to the above-mentioned third T-shaped nonconductive portion, which includes an opposite electrode corresponding to each of at least a part of a gap between two adjacent pixels on q(2m+6) in a group of pixels for a color display composed of a pixel on q(2m+5) and two pixels on q(2m+6) as well as at least a part of a pixel on q(2m+5) facing the above-mentioned two pixels on q(2m+6).

According to the above-mentioned constitution, in a liquid crystal element (a liquid crystal display device) wherein a four-sided minute pixel electrode is arrayed in a delta system for a color display on a display plane, when a pixel row of i-th position from a bottom side upward is defined as q(i) and a group of three adjacent pixels of red, green and blue composed of one of red, green and blue pixels in an odd pixel row q(2m+1) [m: an integer] and one of red, green and blue pixels in an even pixel row q(2m+2) is defined as a group of pixels for a color display and a group of pixels for a color display of j-th position from a left side on q(2m+1) and q(2m+2) is defined as Gq(j), the following function is obtained.

A first T-shaped nonconductive portion which includes an opposite electrode corresponding to each of at least a part of a gap between two adjacent pixels on q(2m+1) in a group of pixels for a color display composed of two pixels on q(2m+1) and a pixel on q(2m+2) as well as at least a part of a pixel on q(2m+2) facing the above-mentioned two pixels on q(2m+1) is arrayed in a lateral (light and left) direction at every three pixels.

A first reverse T-shaped nonconductive portion adjacent to the above-mentioned first T-shaped nonconductive portion, which includes an opposite electrode corresponding to each of at least a part of a gap between two adjacent pixels on q(2m+2) in a group of pixels for a color display composed of a pixel on q(2m+1) and two pixels on q(2m+2) as well as at least a part of a pixel on q(2m+1) facing the above-mentioned two pixels on q(2m+2) is arrayed in a lateral (right and left) direction at every three pixels.

A second T-shaped nonconductive portion shifted leftward by a pixel from the above-mentioned first T-shaped nonconductive portion, which includes an opposite electrode corresponding to each of at least a part of a gap between two adjacent pixels on q(2m+3) in a group of pixels for a color display composed of two pixels on q(2m+3) and a pixel on q(2m+4) as well as at least a part of a pixel on q(2m+4) facing the above-mentioned two pixels on q(2m+3) is arrayed in a lateral (right and left) direction at every three pixels.

A second reverse T-shaped nonconductive portion adjacent to the above-mentioned second T-shaped nonconductive portion, which includes an opposite electrode corresponding to each of at least a part of a gap between two adjacent pixels on q(2m+4) in a group of pixels for a color display composed of a pixel on q(2m+3) and two pixels on q(2m+4) as well as at least a part of a pixel on q(2m+3) facing the above-mentioned two pixels on q(2m+4) is arrayed in a lateral (right and left) direction at every three pixels.

A third T-shaped nonconductive portion shifted leftward by a pixel from the above-mentioned second T-shaped nonconductive portion, which includes an opposite electrode corresponding to each of at least a part of a gap between two adjacent pixels on q(2m+5) in a group of pixels for a color display composed of two pixels on q(2m+5) and a pixel on q(2m+6) as well as at least a part of a pixel on q(2m+6) facing the above-mentioned two pixels on q(2m+5) is arrayed in a lateral (right and left) direction at every thee pixels.

A third reverse T-shaped nonconductive portion adjacent to the above-mentioned third T-shaped nonconductive portion, which includes an opposite electrode corresponding to each of at least a part of a gap between two adjacent pixels on q(2m+6) in a group of pixels for a color display composed of a pixel on q(2m+5) and two pixels on q(2m+6) as well as at least a part of a pixel on q(2m+5) facing the above-mentioned two pixels on q(2m+6) is arrayed in a lateral (right and left) direction at every three pixels.

A liquid crystal element in the thirteenth mode in the second group of inventions is characterized of being a liquid crystal element according to the above-mentioned twelfth mode; and comprising a longitudinal minor nonconductive portion forming a longitudinal area of the nonconductive portion between adjacent pixels in the same pixel row, a lateral minor nonconductive portion forming a lateral area between the above-mentioned adjacent pixels and a pixel in the same group of pixels for a color display as said adjacent pixels, which is opposite to both of these pixels, and a cutting portion of the nonconductive portion dividing the above-mentioned longitudinal minor nonconductive portion and the above-mentioned lateral minor nonconductive portion, instead of at least one of the above-mentioned first to third T-shaped and reverse T-shaped nonconductive portions.

According to the above-mentioned constitution, the following function is obtained.

A longitudinal minor nonconductive portion forming a longitudinal area of the nonconductive portion between adjacent pixels in the same pixel row, a lateral minor nonconductive portion forming a lateral area between the adjacent pixels and a pixel opposite to both of these pixels, and a cutting portion of the nonconductive portion dividing the longitudinal minor nonconductive portion and the lateral minor nonconductive portion, instead of at least one of the first to third T-shaped and reverse T-shaped nonconductive portions is provided in order to prevent a decrease in voltage to the utmost.

A liquid crystal element in the fourteenth mode in the second group of inventions is characterized of being a liquid crystal element according to any one of the above-mentioned twelfth or thirteenth mode; and in that the above-mentioned longitudinal minor nonconductive portion and lateral minor nonconductive portion instead of at least one of the above-mentioned first to third T-shaped and reverse T-shaped nonconductive portions is a nonconductive portion with a lap of 2 μm having a common area with a width of at least 2 μm, in view of Z direction at right angles with a display plane on which a pixel is arrayed.

According to the above-mentioned constitution, the following function is obtained.

The above-mentioned longitudinal minor nonconductive portion and lateral minor nonconductive portion instead of at least one of the first to third T-shaped and reverse T-shaped nonconductive portions is a nonconductive portion with a lap of 2 μm, and consequently the nonconductive portion has a common area with a width of at least 2 μm, in view of Z direction at right angles with a display plane on which a pixel is arrayed. Thus, the same function and effect as a liquid crystal element in the ninth mode in the second group of inventions is obtained.

As described above, according to the second group of inventions, since a nonconductive portion never exists in an original display portion, such an effect is produced that it is possible to provide a liquid crystal display device having no disclination line and spots of a screen, and additionally a fine characteristic of viewing angle and a superior efficiency.

BRIEF DESCRIPTION OF THE DRAWINGS

FIG. 2 is a perspective view showing a conception of the first liquid crystal element in the first group of inventions in the present invention.

FIG. 4 is a perspective view showing a conception of the third liquid crystal element in the first group of inventions in the present invention.

FIG. 5 is a perspective view showing a conception of the fourth liquid crystal element in the first group of inventions in the present invention.

FIG. 6 is a plan cross sectional view showing a conception of the fifth liquid crystal element in the first group of inventions in the present invention.

FIG. 8 is a perspective view showing a conception of irregularities as an information for aligning in the first group of inventions in the present invention.

FIG. 10 is a perspective view showing a conception of a variation of a liquid crystal element in the first group of inventions in the present invention.

FIG. 15 is a plan view showing a pixel with coordinates of a liquid crystal element in the second group of inventions in the present invention.

DESCRIPTION OF THE PREFERRED EMBODIMENTS

[The First Group of Inventions]

Figure 1A:
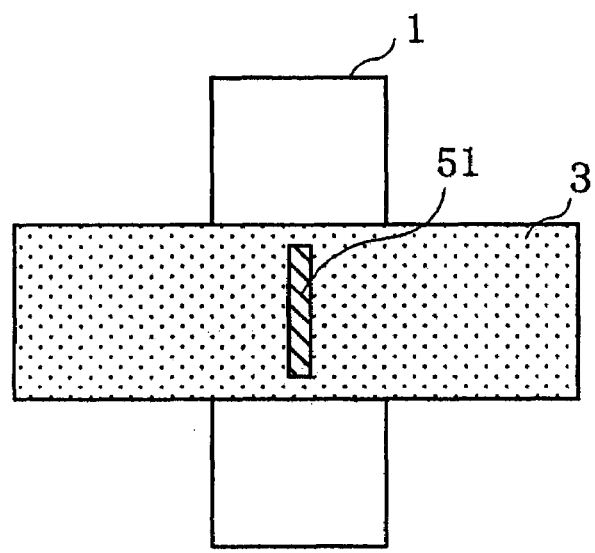
FIG. 1 is a view showing a conception of an electrode portion having an aperture portion of a liquid crystal display device (a liquid crystal element) in a conventional art, and (a) is a plan view, (b) is a front cross sectional view and (c) is an enlarged plan view.
Figure 1B:
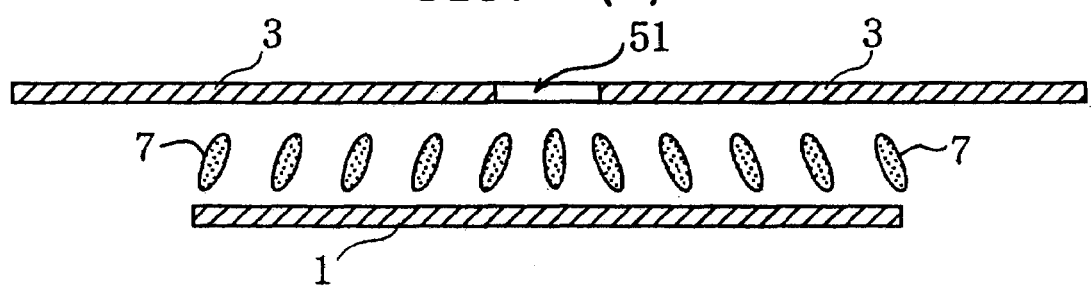
Figure 1C:
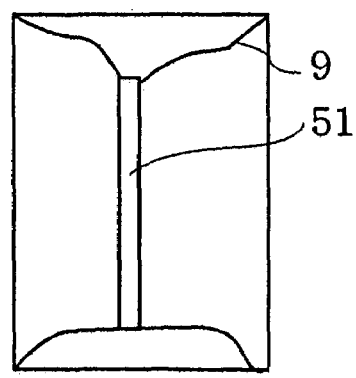

The first group of inventions relates to a liquid crystal element, and a manufacturing method and a driving method thereof.

A liquid crystal element in the first group of inventions is characterized of comprising a liquid crystal molecule which moves in two or more directions phasedly or gradually by applying voltage.

A liquid crystal element in the first group of inventions is constituted by holding between two substrates a liquid crystal having a liquid crystal molecule which moves in two or more directions phasedly or gradually. A liquid crystal element in the first group of inventions is characterized in that an information for aligning a liquid crystal molecule in two different directions by applying voltage between electrodes on each substrate is provided for a substrate. The concrete mode of the information for aligning is described by dividing into the following first to fifth liquid crystal elements. A stripe electrode for a simple matrix, a transparent electrode like ITO, and a reflective electrode formed by a substance with a high reflectivity like aluminum (Al) and silver (Ag) are provided for a substrate, and a polarizer is joined on the outer side of the two substrates. A polarizer is a film using resin like iodine and dyestuff, and a plate for polarizing light of Glan-Thomson prism utilizing crystal plane.

(The First Liquid Crystal Element)

The first liquid crystal element is described referring FIG. 2. FIG. 2 is a perspective model view showing a conception of the first liquid crystal element.

The first liquid crystal element is constituted by holding a liquid crystal with a negative dielectric anisotropy $\Delta\epsilon$ between an upper substrate 101 and a lower substrate 102 disposed in parallel. A multitude of layers of a liquid crystal molecule 103 (only one layer contacting with the lower substrate 102 is shown in FIG. 2) are included in a liquid crystal. A polarizer 104 with a lateral transmission axis 106 is disposed outside the upper substrate 101, and a polarizer 105 with a longitudinal transmission axis 107 is disposed outside the lower substrate 102.

An information for aligning the liquid crystal molecule 103 in two different directions is provided for a surface of at least one of the substrates 101 and 102. It is preferable to provide the information for aligning for both substrates 101 and 102 to one of the substrates 101 and 102 because of increasing the alignment stability. When the information for aligning is provided for a surface of both substrates 101 and 102, a direction on a substrate and the corresponding direction on the other substrate are parallel. Therefore, a liquid crystal element with a high efficiency and a high contrast is obtained.

For instance, an information for aligning provided for both substrates 101 and 102 can be irregularities. When a dielectric anisotropy $\Delta\epsilon$ of a liquid crystal held between two substrates 101 and 102 for which an information for aligning is provided by irregularities is negative, it is preferable that the liquid crystal molecule 103 has a hybrid alignment. That is, the liquid crystal molecule 103 contacting with either of the substrates 101 and 102 has an angle of 80 to 90° with a surface of the substrate, and a liquid crystal molecule contacting with a surface of the other substrate has a horizontal alignment. Or, the utilization efficiency of light can be raised further by a vertical alignment (VA), in which the liquid crystal molecule 103 contacting with a surface of both substrates 101 and 102 has an angle of 80 to 90° with a surface of both substrates 101 and 102.

In order to obtain an extremely high contrast, a direction of inclining the liquid crystal molecule 103 and a direction of the transmission axis 106 of the polarizer 104 are made parallel by inclining the liquid crystal molecule 103 in a direction of the transmission axis 106 slightly with rubbing in an initial state (FIG. (a)). Since a transmission axis of a polarizer is disposed at an angle of 45° with a direction of inclining the liquid crystal molecule 103 in a conventional VA liquid crystal mode, a slight light leakage occurs in a black display and a decrease in contrast is caused. However, in a liquid crystal element of the present invention, since a direction of inclining the liquid crystal molecule 103 and a direction of the transmission axis 106 of the polarizer 104 are parallel, light is never modulated by the liquid crystal molecule 103. Therefore, it is possible to obtain the same light cutoff as a light cutoff (black display) caused by only the upper polarizer 104 and the lower polarizer 105, and thereby an extremely high contrast.

Next, when a dielectric anisotropy $\Delta\epsilon$ of a liquid crystal held between the substrates 101 and 102 for which an information for aligning is provided is negative, the action of the liquid crystal molecule 103 is described. The liquid crystal molecule 103 before an application of voltage between electrodes (not shown in FIG. 2) is aligned approximately vertically to the upper and lower substrates 101 and 102, as shown in FIG. 2(a). In a state of FIG. 2(a), since the transmission axis 106 and the transmission axis 107 of the polarizers 104 and 105 cross each other at right angles and the liquid crystal molecule 103 is aligned approximately vertically to the upper and lower substrates 101 and 102, an incident light from above the upper substrate 101 and from below the lower substrate 102 does not transmit through the polarizers 104 and 105 at all.

Under an application of voltage, the liquid crystal molecule 103 is inclined in parallel with the upper polarizer 104, and is aligned in parallel with the substrates 101 and 102 as shown in FIG. 2(b) (the first stage). However, in a state of FIG. 2(b), since the liquid crystal molecule 103 is inclined in parallel with the transmission axis 106 of the upper polarizer 104, nevertheless an incident light does not transmit through the polarizers 104 and 105 at all.

Under a more application of voltage, the liquid crystal molecule 103 moves in a different direction from the first stage, namely, on a parallel plane with the substrates 101 and 102, and is arrayed at an angle of approximately 45° with both of the transmission axis 106 of the upper polarizer 104 and the transmission axis 107 of the lower polarizer 105 as shown in FIG. 2(c) (the second stage). In a state of FIG. 2(c), an incident light transmits through by determining an appropriate thickness of a liquid crystal layer.

Thus, the liquid crystal molecule 103 moves in two different directions between the substrates 101 and 102, and thereby a characteristic of a liquid crystal element is improved. That is, in a liquid crystal element of the present invention, the liquid crystal molecule 103 moves in two different directions, and thereby the transmittance and cutoff of incident light can be controlled, and the switching is executed on a plane like IPS mode. Therefore, a characteristic of a wide viewing angle is obtained.

It is preferred that a direction in which the liquid crystal molecule 103 moves is not only two directions but also two or more directions. The liquid crystal molecule 103 may move from the first stage to the second stage not phasedly but gradually, additionally, in an arc. However, a liquid crystal element with a superior characteristic can be obtained if the liquid crystal molecule 103 moves phasedly.

(The Second Liquid Crystal Element)

The second liquid crystal element is described referring FIG. 3. FIG. 3 is a perspective model view showing a conception of the second liquid crystal element.

The second liquid crystal element is constituted by holding a liquid crystal with a positive dielectric anisotropy $\Delta\epsilon$ between an upper substrate 201 and a lower substrate 202. A multitude of layers of a liquid crystal molecule 203 (only one layer contacting with the lower substrate 202 is shown in FIG. 3) are included in a liquid crystal. The liquid crystal molecule 203 is aligned in parallel with the substrates 201 and 202 under no application of voltage.

A polarizer 204 with a lateral transmission axis 206 is disposed outside the upper substrate 201, and a polarizer 205 with a longitudinal transmission axis 207 is disposed outside the lower substrate 202. An information for aligning the liquid crystal molecule 203 in two different directions is provided for a surface of at least one of the substrates 201 and 202. When the information for aligning is provided for a surface of two substrates 201 and 202, a direction on a substrate and the corresponding direction on the other substrate are parallel. Therefore, a liquid crystal element with a high efficiency and a high contrast is obtained. Since this information for aligning is the same as the first liquid crystal element, its description is omitted.

However, the second liquid crystal element having a liquid crystal with a positive dielectric anisotropy $\Delta\epsilon$ is different from the first liquid crystal element. That is, it is preferable that the liquid crystal molecule 203 contacting with a surface of either of the substrates 201 an 202 has an angle of 0° to 10° with a surface of the substrate, and a liquid crystal molecule 203 contacting with a surface of the other substrate has a vertical alignment of 80 to 90°, namely, a hybrid alignment. In addition, a more efficient and superior liquid crystal element is obtained by a horizontal alignment, in which the liquid crystal molecule 203 contacting with a surface of both substrates 201 and 202 has an angle of 0 to 10° with a surface of both substrates 201 and 202.

Figure 3A:
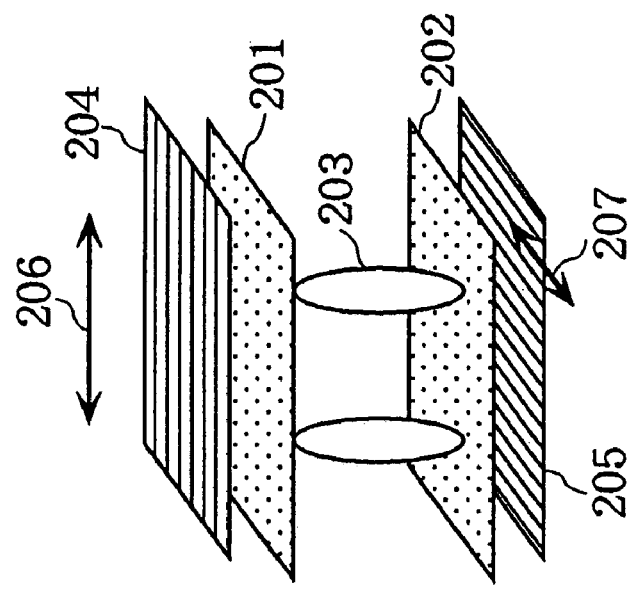
FIG. 3 is a perspective view showing a conception of the second liquid crystal element in the first group of inventions in the present invention.

Next, when a dielectric anisotropy Δε of a liquid crystal held between the substrates 201 and 202 for which an information for aligning is provided is positive, the action of the liquid crystal molecule 203 is described. The liquid crystal molecule 203 before an application of voltage between electrodes (not shown in FIG. 3) is aligned approximately parallel with the upper and lower substrates 201 and 202 as well as is inclined at an angle of 45° with the transmission axes 206 and 207, as shown in FIG. 3(a). In a state of FIG. 3(a), since the transmission axis 206 and the transmission axis 207 of the upper and lower polarizers 204 and 205 cross each other at right angles and the liquid crystal molecule 203 is inclined at an angle of 45° with the transmission axis 206, an incident light from above and below transmits completely through the polarizers 204 and 205 by determining a thickness of a liquid crystal layer appropriately.

Figure 3B:
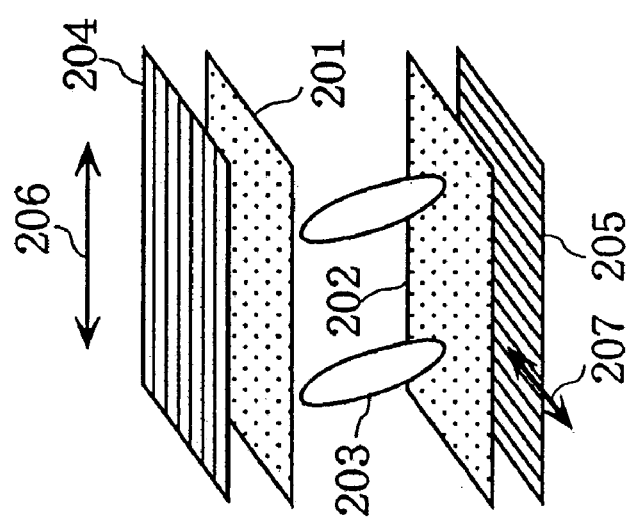

Later, under an application of voltage, the liquid crystal molecule 203 stands up remaining at an angle of 45° with the transmission axes 206 and 207 as shown in FIG. 3(b) (the first stage). In this state, since the liquid crystal molecule 203 is inclined with substrates 201 and 202, an incident light transmits slightly through the polarizers 204 and 205.

Figure 3C:
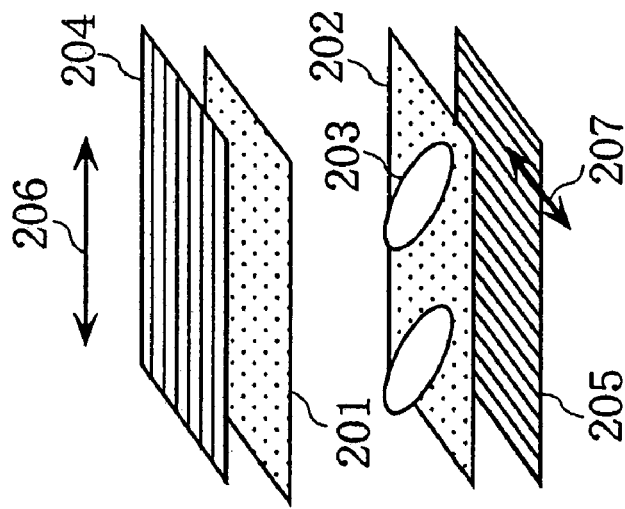

Under a more application of voltage, the liquid crystal molecule 203 moves in a different direction from the first stage, namely, in parallel with the transmission axis 206 and vertically to the transmission axis 207 as shown in FIG. 3(c) (the second stage). When the liquid crystal molecule 203 becomes in parallel with the transmission axis 206 of the polarizer 204, an incident light is cut off completely.

The liquid crystal molecule 203 moves in such two different directions, and thereby a characteristic of a liquid crystal element is improved. The second liquid crystal element is different from a conventional TN mode, as shown in FIG. 3(c), since an orthogonal projection of all liquid crystal molecules 203 onto the polarizer 205 is parallel with the transmission axis 206 and vertical to the transmission axis 207 in a state of cutting off light (black display), a complete cutoff of light can be achieved and a high contrast can be obtained.

It is preferred that a direction in which the liquid crystal molecule 203 in the second liquid crystal element moves is not only two directions but also two or more directions. The liquid crystal molecule 203 may move from the first stage to the second stage not phasedly but gradually, additionally, in an arc.

(The Third Liquid Crystal Element)

The third liquid crystal element is described referring FIG. 4. The third liquid crystal element is characterized in that such two kinds of information for aligning as irregularities 401 and 404 and rubbing 407 and 408 are provided for substrates 403 and 406. The rubbing treatment is executed by using rayon, cotton and the like on an alignment layer for a vertical alignment applied on an opposite plane of the substrates 403 and 406. An empty cell is constructed in an ordinary method by disposing two substrates 403 and 406 with the rubbing direction 407 of the lower substrate 403 reverse to the rubbing direction 408 of the upper substrate 406.

Polarizers 410 and 411 are disposed outside the substrates 403 and 406 so that transmission axes 412 and 413 cross each other at right angles. The rubbing direction 407 of the lower substrate 403 is the same as the transmission axis 412 of the lower polarizer 410. The third liquid crystal element is completed by sealing a liquid crystal with a negative dielectric anisotropy Δε between the substrates 403 and 406. A multitude of layers of a liquid crystal molecule 409 (only one layer contacting with the lower substrate 403 is shown in FIG. 4) are included in a liquid crystal.

Under no application of voltage between electrodes 402 and 405, as shown in FIG. 4(a), an end of a major axis of the liquid crystal molecule 409 contacts with a surface of the substrates 403 and 406. The liquid crystal molecule 409 receives an information for aligning of the rubbing directions 407 and 408, and is inclined slightly in the rubbing directions 407 and 408. Then, since the liquid crystal molecule 409 is inclined in a direction of the transmission axes 412 and 413 of the polarizers 410 and 411, an incident light from above and below is cut off completely.

Next, under an application of voltage between electrodes 402 and 405, the liquid crystal molecule 409 is inclined further in the rubbing directions 407 and 408 as shown in FIG. 4(b) (the first stage). Similarly, an incident light is cut off.

Under a more application of voltage between electrodes 402 and 405, the liquid crystal molecule 409 receives an information for aligning of the irregularities 401 and 404 on the substrates 403 and 406, and as shown in FIG. 4 (c), is aligned in directions of the irregularities 401 and 404 on the substrates 403 and 406, and thereby a side of a major axis of the liquid crystal molecule 409 contacts with a surface of the substrates 403 and 406 (the second stage). Then, since the liquid crystal molecule 409 is aligned at an angle of 45° in a direction of the transmission axes 412 and 413 of the polarizers 410 and 411, an incident light transmits through under a modulation by the liquid crystal molecule 409.

Thus, because of changing a direction of the liquid crystal molecule 409 with two phases by two kinds of information for aligning, the third liquid crystal element has an extremely high contrast, and since the transmittance and cutoff of light is executed by the movement of the liquid crystal molecule 409 between the substrates 403 and 406, a characteristic of a viewing angle is greatly improved.

In this example, the first stage wherein the liquid crystal molecule 409 is inclined upward and downward and the second stage wherein the liquid crystal molecule 409 is aligned on a plane are executed as different phases. The first stage and the second stage may be executed as a phase, such as the liquid crystal molecule 409 is inclined upward and downward and simultaneously aligned on a plane. In this example, a liquid crystal molecule is aligned vertically by applying an alignment layer for a vertical alignment on a surface of both substrates 403 and 406, and a hybrid type wherein an alignment layer for a horizontal alignment is applied on one of the substrates 403 and 406 may be used.

An appropriate voltage above a threshold voltage of the liquid crystal molecule 409 is determined at a driving voltage of a liquid crystal molecule. That is, it is preferable to execute the switching of light by not a threshold voltage at which the liquid crystal molecule 409 is inclined in a direction of the transmission axes 412 and 413 of the polarizers 410 and 411, but a voltage above a voltage, over the threshold voltage, at which an angle of a liquid crystal molecule changes on a plane. The reason is that the switching only in a range of high voltage enables a high-speed response since the higher voltage is, the higher the speed of response of a liquid crystal is.

(The Fourth Liquid Crystal Element)

The fourth liquid crystal element is described referring FIG. 5. The fourth liquid crystal element is characterized of using a liquid crystal with a positive dielectric anisotropy Δε, and the other conditions are approximately the same as the third liquid crystal element. That is, such two kinds of information for aligning as irregularities 501 and 504 and rubbing 507 and 508 are provided for upper and lower substrates 503 and 506 of the fourth liquid crystal element. The irregularities 501 and 504 are formed by the same method as the third liquid crystal element. The rubbing treatment is executed after applying an alignment layer for a horizontal alignment (an alignment layer for TN) on an opposite plane of the lower substrate 503 with the irregularities 501 and an electrode 502 and the upper substrate 506 with the irregularities 504 and an electrode 503. A rubbing direction 507 of the lower substrate 503 is reverse to a rubbing direction 508 of the upper substrate 506.

The fourth liquid crystal element is completed by making two substrates 503 and 506 opposite to each other in parallel; constructing an empty cell in an ordinary method; sealing a liquid crystal with a positive dielectric anisotropy Δε between two substrates 503 and 506; disposing polarizers 510 and 511 outside the substrates 503 and 506 so that transmission axes 512 and 513 cross each other at right angles. The fourth liquid crystal element has such two kinds of information for aligning formed on the substrates 503 and 506 as the irregularities 501 and 504 and the rubbing 507 and 508. A multitude of layers of a liquid crystal molecule 509 (only one layer contacting with the lower substrate 503 is shown in FIG. 5) are included in a liquid crystal.

Under no application of voltage between electrodes 502 and 505, as shown in FIG. 5(*a*), a major axis of the liquid crystal molecule 509 contacts with a surface of the substrates 503 and 506. The liquid crystal molecule 509 is affected by a rubbing direction of an alignment layer for a horizontal alignment having an extremely great alignment control force, and is aligned approximately in parallel (0 to 10°) with the rubbing directions 507 and 508, and is inclined at an angle of 45° with a direction of the transmission axes 512 and 513 of the polarizers 510 and 511. Accordingly, then, an incident light from above and below transmits through completely.

Under an application of voltage between electrodes 502 and 505, the liquid crystal molecule 509 stands up remaining inclined in the rubbing directions 507 and 508 as shown in FIG. 5(*b*) (the first stage). That is, an angle between a surface of the substrates 503 and 506 as well as a major axis of the liquid crystal molecule 509 increases. An incident light is cut off gradually as the angle increases.

Under a more application of voltage between electrodes 502 and 505, an interaction between the liquid crystal molecule 509 and the rubbing directions 507 and 508 decreases, and thereby the liquid crystal molecule 509 receives an information for aligning of the irregularities 501 and 504 on the substrates 503 and 506, and as shown in FIG. 5(*c*), is aligned in directions of the irregularities 501 and 504 on the substrates 503 and 506 (the second stage). Then, since an orthogonal projection of the liquid crystal molecules 509 onto the polarizer 510 is vertical to the transmission axis 512 of the polarizer 510 and parallel with the transmission axis 513 of the polarizer 511, an incident light is cut off completely without a modulation by the liquid crystal molecule 509.

Thus, in a state of cutting off light by changing a direction of the liquid crystal molecule 509 with two phases, an extremely high contrast is obtained because of arraying almost all the liquid crystal molecule 509 in a direction of the transmission axes 512 and 513 of the polarizers 510 and 511.

In this example, the first stage wherein the liquid crystal molecule 509 is inclined upward and downward and the second stage wherein the liquid crystal molecule 509 is aligned on a plane are executed as different phases. The first stage and the second stage may be executed as a phase, such as the liquid crystal molecule 409 is inclined upward and downward and simultaneously aligned on a plane. In this example, a liquid crystal molecule is aligned horizontally by applying an alignment layer for a horizontal alignment on a surface of both substrates 503 and 506, and a hybrid type wherein an alignment layer for a vertical alignment is applied on one of the substrates 503 and 506 may be used.

As described above, a liquid crystal molecule has an extremely great characteristic, whether a dielectric anisotropy Δε of a liquid crystal is negative or positive.

(The Fifth Liquid Crystal Element)

The fifth liquid crystal element is described referring FIG. 6. FIG. 6 is a plan cross sectional view of the fifth liquid crystal element from above. FIG. 6 shows a substrate 701, irregularities 702, a liquid crystal molecule 703 in a liquid crystal with a negative dielectric anisotropy Δε, a rubbing direction 704, a transmission axis 705 of a first polarizer, and a transmission axis 706 of a second polarizer. A zigzag line in a lateral direction indicates a ridgeline of the irregularities 702. Two polarizers not shown in the FIG. are disposed above and below so as to sandwich the substrate 701. The fifth liquid crystal element is characterized in that the irregularities 702 is provided by a zigzag microarea 707 in two directions at right angles with each other, and the liquid crystal molecule 703 can be aligned in each direction.

An alignment layer for a vertical alignment is applied on a surface of the substrate 701. Under no application of voltage, the liquid crystal molecule 703 is aligned approximately vertically to a surface of the substrate by the alignment layer, as shown in FIG. 6(*a*). In a state of FIG. 6(*a*), the liquid crystal molecule 703 is inclined slightly in a rubbing direction, and thereby an incident light does not transmit through at all.

Next, under an application of voltage, the liquid crystal molecule 703 is inclined in a rubbing direction, as shown in FIG. 6(*b*). Under a more application of voltage, the liquid crystal molecule 703 is aligned again in the microarea 707 along the irregularities 702 on the substrate 701, as shown in FIG. 6(*c*). Then, the irregularities 702 on the substrate 701 is formed by the zigzag microarea 707 in two directions at right angles with each other, the liquid crystal molecule 703 is aligned in two directions at right angles with each other at each microarea 707. Thus, an incident light transmits through by an alignment of the liquid crystal molecule 703, and thereby a wide viewing angle is obtained and symmetry is improved.

(The Method of Forming Irregularities)

The method of forming irregularities as an information for aligning is described. The irregularities is formed by applying photosensitive resin with a thickness of 0.1 to 5 μm on an electrode of two substrates, and patterning a cutoff area in a stripe with the use of a photomask with a stripe pattern having a pitch of 0.1 to 5 µm. A ratio of the cutoff area to an exposed area is not necessarily 1:1. Even if the irregularities do not have a complete pattern in a stripe, a resist in an exposed area may remain, for instance, a positive resist.

Either of interferential fringes of laser with photosensitive resin, a laser beam, and a laser ablation may be used as another method of patterning the irregularities. Moreover, the irregularities may be formed in a direction by coating an inorganic substance, an organic substance or an electrode on a substrate without using photosensitive; and adding a physical contact like extension, scratch and rub. After forming the irregularities on another substrate or a roller like printing, and it can be transferred. It is possible to transfer by rolling with a roll coater or to transfer by sticking with a flat plate. It is not necessary to transfer the whole substrate at a time, and the irregularities may be added on the whole substrate by dividing into small areas and transferring several times.

Figure 7:
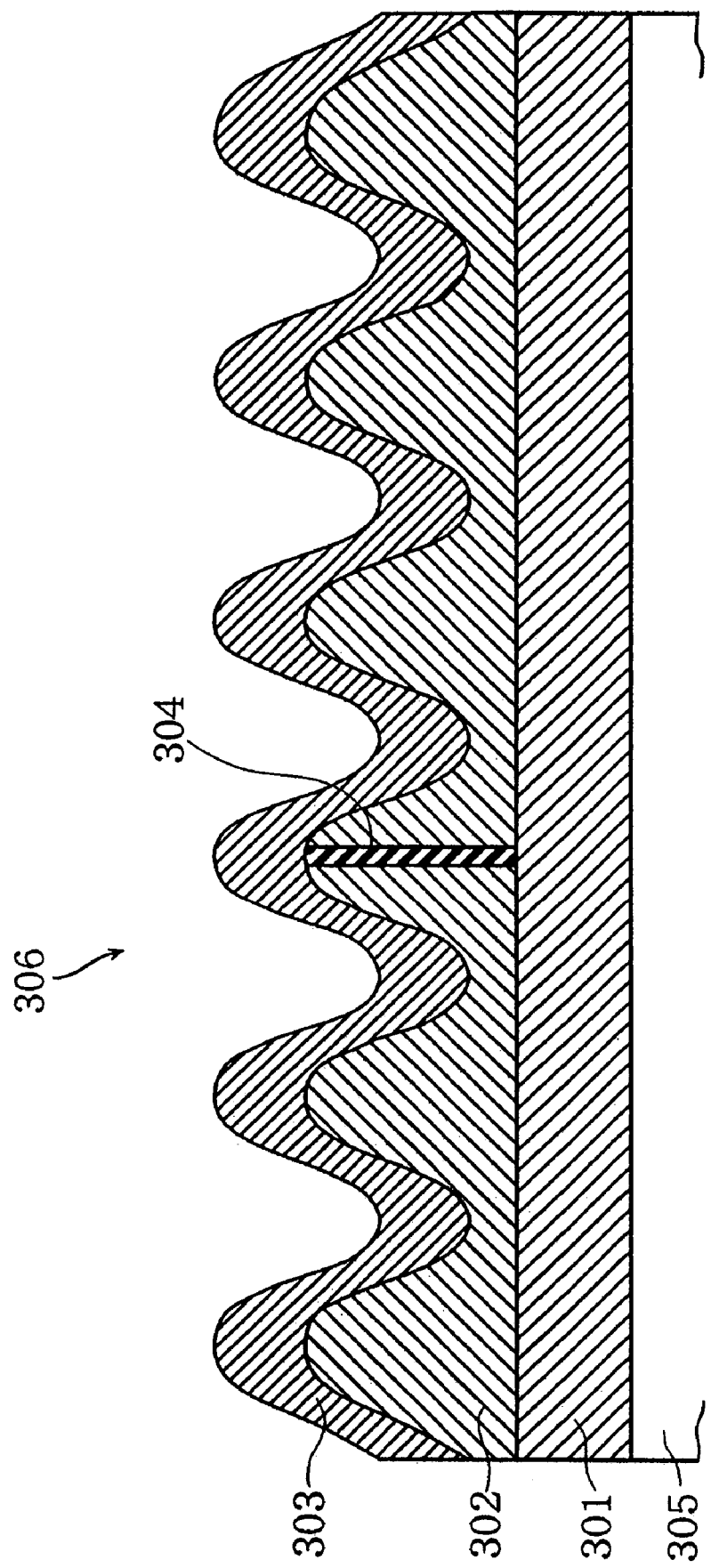
FIG. 7 is a front cross sectional view enlarging irregularities as an information for aligning in the first group of inventions in the present invention.

An information for aligning of irregularities 306 in a wave plate as shown in FIG. 7 is described. If the irregularities 306 is composed of only an insulating layer 302 such as a resist on a surface of a flat electrode 301 on a substrate 305, an applied voltage for driving a liquid crystal molecule has to be high since not merely the liquid crystal molecule but also the insulating layer 302 of a resist interposes between the electrodes 301. Therefore, the irregularities 306 is constituted by forming the insulating layer 302 in a wave plate on the electrode 301 on the substrate 305, coating a thin conductive layer 303 on the insulating layer 302, and connecting the electrode 301 and the conductive layer 303 by a conductive continuity portion 304. A seizure in the insulating layer 302 and a high applied voltage can be prevented by providing the conductive layer 303 on a surface of the insulating layer 302 in a wave plate. A material of the electrode 301 and the conductive layer 303 can be made the same or different.

Next, irregularities 601 on a substrate are described referring FIG. 8. It is not necessary that the irregularities 601 on a substrate is in a stripe as shown in FIG. 8(a), and a groove or a projection may extend in a particular direction or may be divided halfway, as shown in FIG. 8(b). Furthermore, a groove or a projection may have different width and interval. However, a pitch of the irregularities 601 is 5 µm or less, and if a ratio of height to pitch is 0.01 to 10, a liquid crystal molecule is aligned easily.

An irradiation of ultraviolet rays with polarized and unpolarized light and a diagonal irradiation of ultraviolet rays as well as the irregularities on a substrate and a rubbing direction may be used as an information for aligning in two or more directions. Either of a linearly polarized light or not may be used as ultraviolet rays, and a linearly polarized light is preferable and additionally it is possible to irradiate at an angle with a substrate. If chemical bond reactive by ultraviolet rays exists on a surface of a substrate before irradiating, an information for aligning is provided easily because of the occurrence of bond and decomposition by irradiating ultraviolet rays. An alignment layer such as polyimide and siloxane available on public sale is used most easily.

A liquid crystal molecule may respond with two phases by using a method in which a diagonal electric field is caused in a liquid crystal layer with an area of no electrode on a surface of a substrate, and a method in which a diagonal electric field is caused by forming the third electrode besides each electrode on two substrates.

Although an information for aligning in two or more directions may be the same such as a rubbing direction and a rubbing direction, different information for aligning such as the irregularities on a substrate and the irradiation of ultraviolet rays forms a difference in alignment control force easily, and thereby a liquid crystal molecule moves easily from the first alignment direction to the second alignment direction and a superior liquid crystal element can be obtained.

When an information for aligning, particularly for determining an alignment state of liquid crystal transmitting light, is divided into two or four directions in a plane, a viewing angle is improved further and a superior liquid crystal element is obtained.

It is preferable to use a thin film transistor (TFT) and a metal-insulator-metal (MIM) as a driving element of the above-mentioned first to fifth liquid crystal elements. The first to fifth liquid crystal elements in the first group of inventions may be either a reflection type or a transmission type, and can be used as not merely a direct-vision monitor and a television using a polarizer but also a display element like a projector using an optical element like a polarized beam splitter. In addition, the liquid crystal element in the first group of inventions can be used as an optical switching element utilizing transmission and cutoff of light, reflection and cutoff of light.

(The Method of Manufacturing)

Figure 9A:
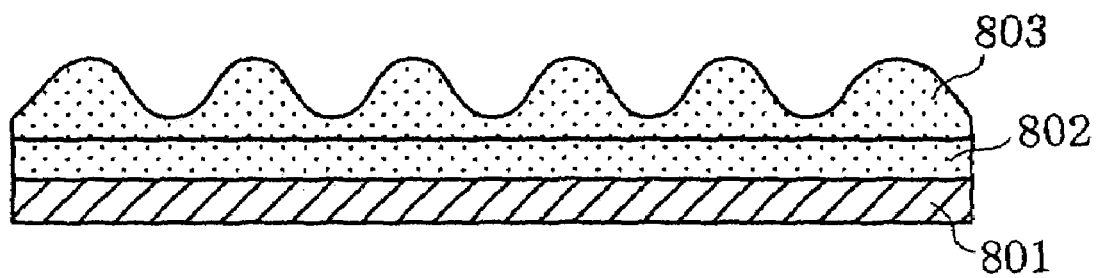
FIG. 9 is a front cross sectional view showing a conception of a liquid crystal element in the first group of inventions in the present invention.

A concrete method of manufacturing a liquid crystal element in the first group of inventions is described referring FIG. 9. In order to manufacture a liquid crystal element, as shown in FIG. 9(a), a transparent conductive film 802 with a thickness of 1000 Å is formed on a surface of a glass substrate 801 optically ground (12 mm×17 mm×1.1 mm) by indium tin oxide (hereinafter referred to as 'ITO') in a sputtering method. Later, a positive resist with a thickness of 1 µm is applied, and irregularities 803 in a wave plate are formed in a resist pattern with a pitch of 1 µm having a stripe by photolithography. After curing through heat treatment at a temperature of 150° C. for 30 minutes, a vertical alignment layer is applied with a thickness of 200 Å, and after curing at a temperature of 250° C., rubbing is executed with a cotton cloth in a direction of 45° with the irregularities 803.

Figure 9B:
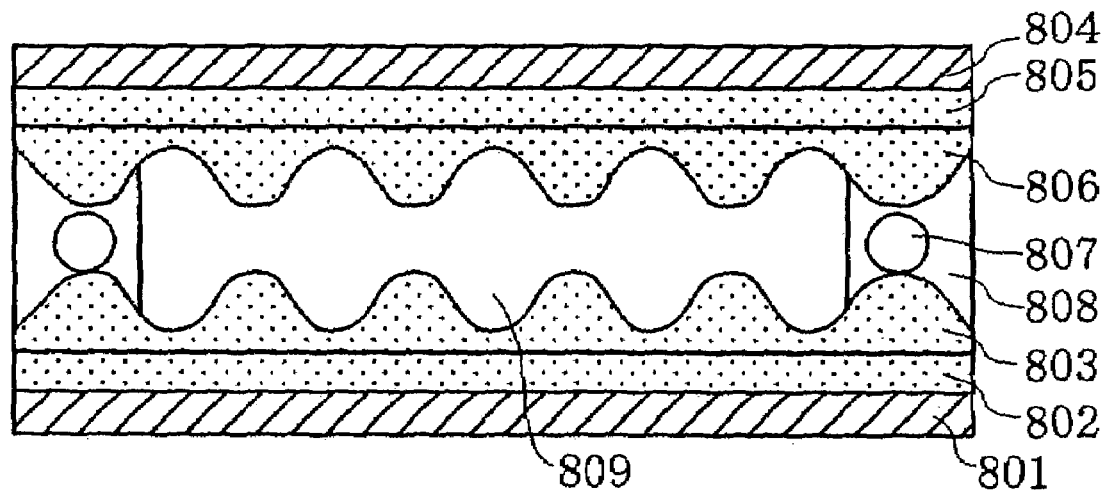

Like the other glass substrate 804, a transparent conductive film 805 is formed, irregularities 806 are formed and rubbing is executed. The two glass substrates 801 and 804, as shown in FIG. 9(b), are opposite to each other with a gap so that a direction of pitch of the irregularities 803 and 806 is parallel and a direction of rubbing is reverse, and are stuck with a seal resin 808 including a bead 807 with a diameter of 3 µm, and thereby an empty cell is constructed. A liquid crystal element is completed by vacuum-injecting a liquid crystal 809 with a dielectric anisotropy Δε of −4.1 and a birefringence of 0.12 into the empty cell.

When a contrast of the liquid crystal element was observed after disposing a polarizer above and below the glass substrates 801 and 804, a contrast of 3000:1 was obtained, and when a viewing angle was observed, a contrast of 10:1 was obtained in a range of an angle of 160' or more toward up and down as well as right and left.

(Variations)

Figure 11C:
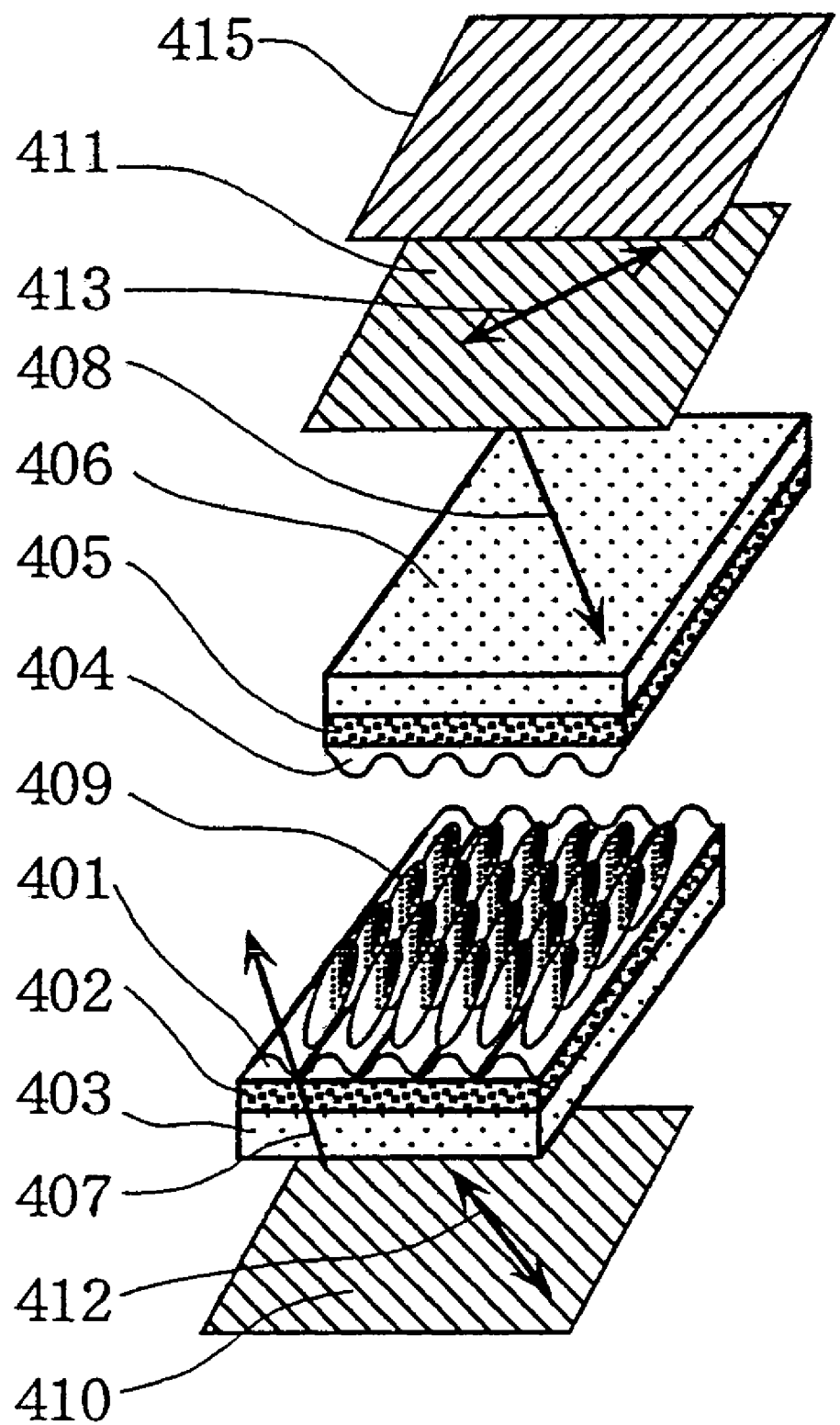
FIG. 11 is a perspective view showing a conception of a variation (except for FIG. 10) of a liquid crystal element in the first group of inventions in the present invention.

A liquid crystal element in the first group of inventions has a superior viewing angle, and additionally, a characteristic of a liquid crystal element is improved by interposing a retardation plate 414 between a substrate 406 and a polarizer 411 as shown in FIG. 10, or by disposing a scattering plate 415 outside the polarizer 411 as shown in FIG. 11. Moreover, the retardation plate 414 can be interposed between the other substrate 403 and polarizer 410 as well, and two or more retardation plates 414 can be interposed between the substrate 403 and the polarizer 410 as well as the substrate 406 and the polarizer 411. The retardation plate 414 can be combined with the scattering plate 415 by disposing two or more scattering plates 415. The retardation plate 414 and the scattering plate 415 are shown in the FIGS. in a liquid crystal element wherein a liquid crystal with a negative dielectric anisotropy $\Delta\epsilon$ is held between the substrates 403 and 406, and two kinds of information for aligning are provided. Similarly, the retardation plate 414 and the scattering plate 415 can be provided in other liquid crystal elements.

When a liquid crystal element in the first group of inventions is used for a reflection type liquid crystal projector, a polarized beam splitter can be provided opposite to a substrate on the side of display. A polarized beam splitter is an optical element for dividing natural light including an S wave and a P wave into an S wave and a P wave. Only an S wave of natural light emitted from a lamp is irradiated to a liquid crystal element by a polarized beam splitter, and later, the S wave transmits through a substrate on the side of display and is reflected by a reflective plane of the other substrate and transmits through the polarized beam splitter. In the first group of inventions, only such a polarized beam splitter, or a polarized beam splitter and a polarizer can be provided.

[The Second Group of Inventions]

Next, a liquid crystal element the second group of inventions is described. In a liquid crystal element the second group of inventions, a disclination line in a pixel display portion does not occur because of a filly devised opposite electrode, and the unevenness of luminance on a display plane is never caused, and the viewing angle toward up and down as well as right and left is improved. A liquid crystal element in the second group of inventions is composed of, for instance, a homeotropic type liquid crystal, and is characterized of comprising a multitude of pixel electrodes which are divided minutely, and a liquid crystal to which an electric field is applied by the above-mentioned pixel electrodes; and in that an electric field direction of the liquid crystal between at least one pair of adjacent pixels is inclined against an electrode plane. In a liquid crystal element in the second group of inventions, a nonconductive portion is provided in a part of the opposite electrode which is opposite to a gap between at least one pair of adjacent pixel electrodes for the purpose of inclining like that.

(The First Liquid Crystal Element)

Figure 12:
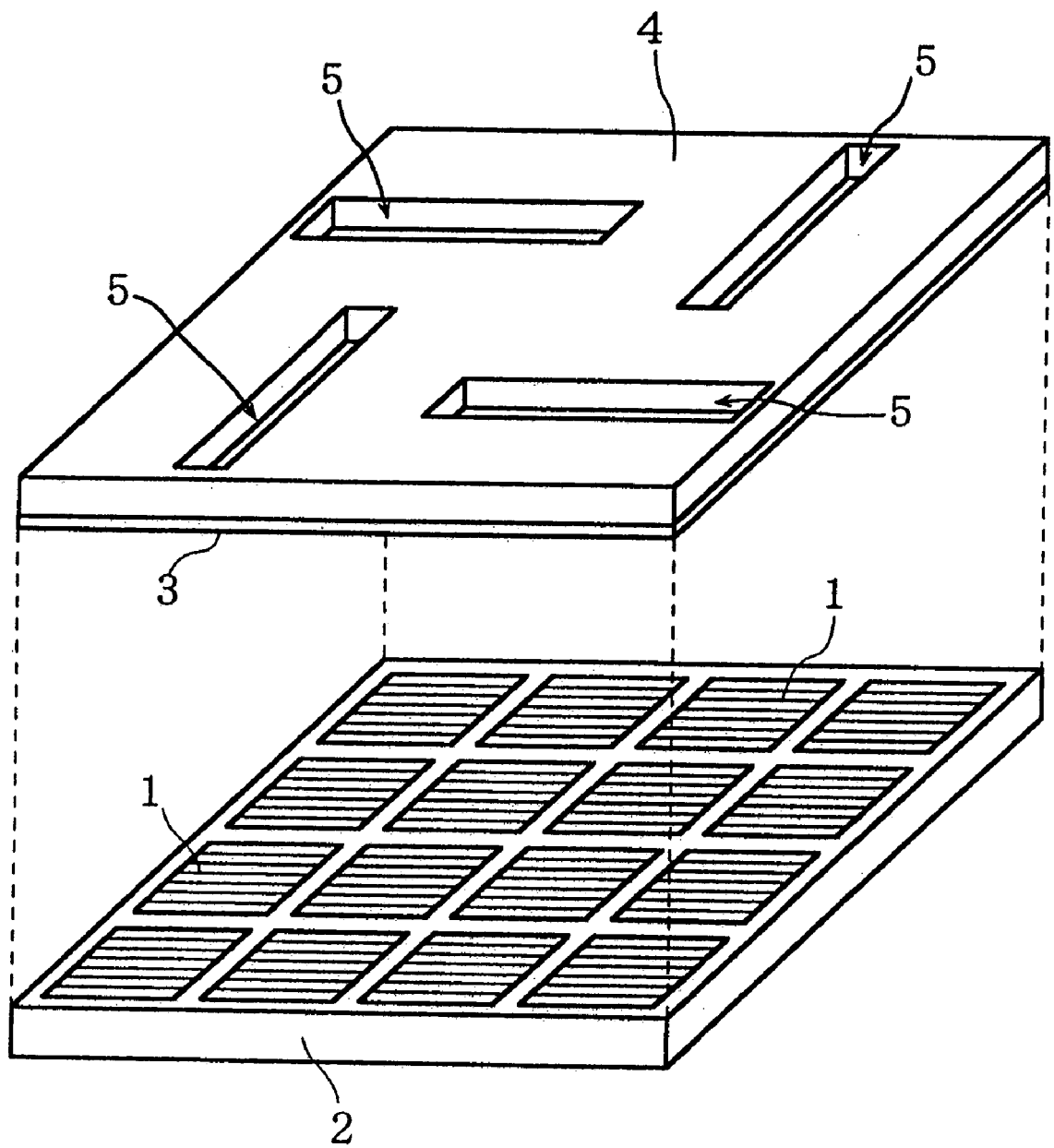
FIG. 12 is an exploded perspective view showing a conception of a main body of a liquid crystal element in the second group of inventions in the present invention.

In the first liquid crystal element, as shown in FIG. 12, a TFT substrate 2 with a pixel electrode 1 is opposite in parallel to a glass substrate 4 with an opposite electrode 3. The TFT substrate 2 and the glass substrate 4 are stuck with a predetermined gap, and the substrates are sealed after injecting a liquid crystal with a negative dielectric anisotropy $\Delta\epsilon$ between the gap. A vertical alignment layer is applied on a surface (the side of liquid crystal) of the TFT substrate 2 by spin coat or printing, and later heat treatment is executed at an appropriate temperature. Similarly, a vertical alignment layer is applied on the glass substrate 4 by spin coat or printing, and later heat treatment is executed at an appropriate temperature. A general ITO, which is high in the transmittance of light and easy to manufacture, is used as the opposite electrode 3 formed on the glass substrate 4.

Figure 13:
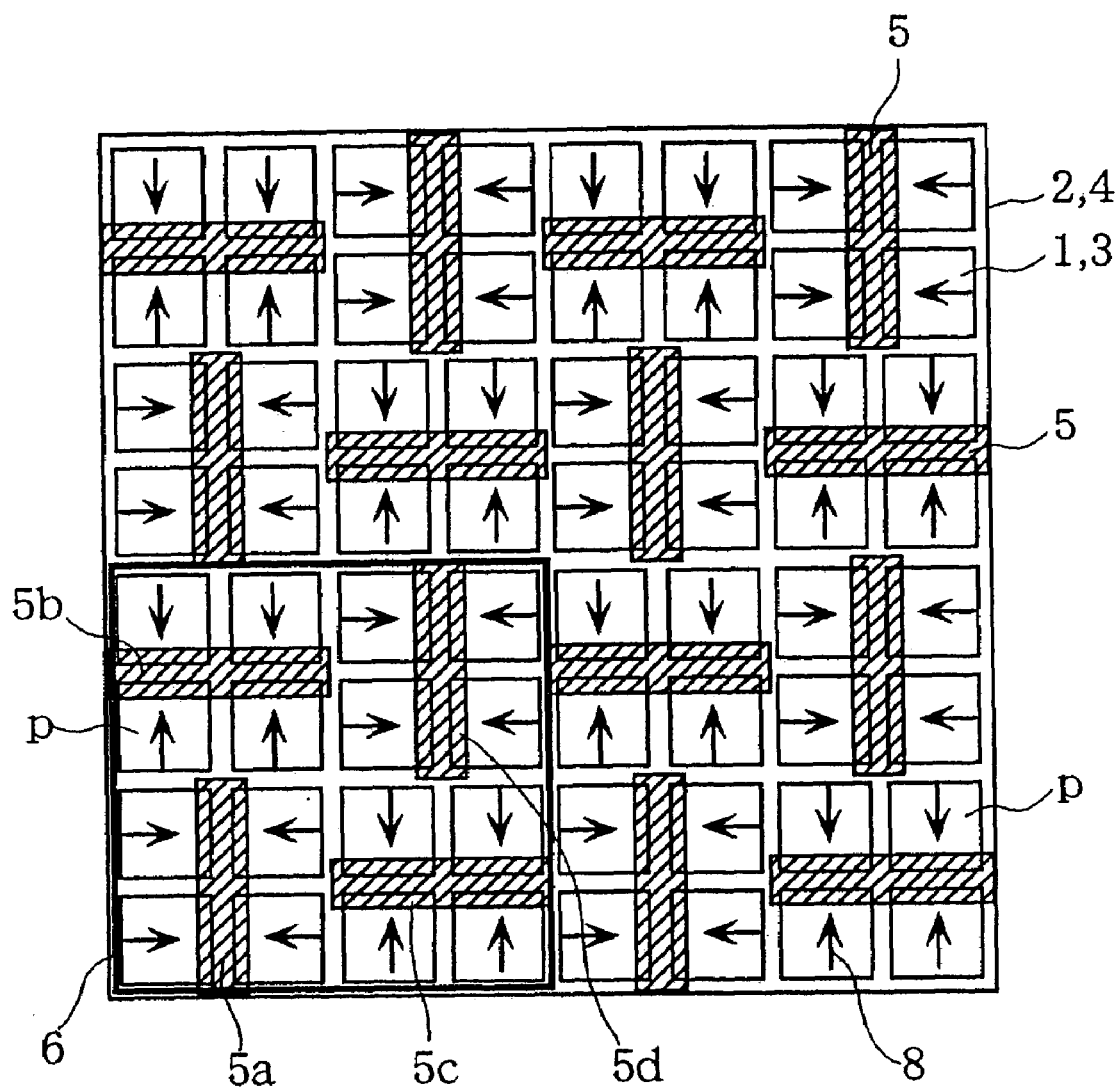
FIG. 13 is a plan view showing a conception of the first liquid crystal element in the second group of inventions in the present invention.
Figure 14:
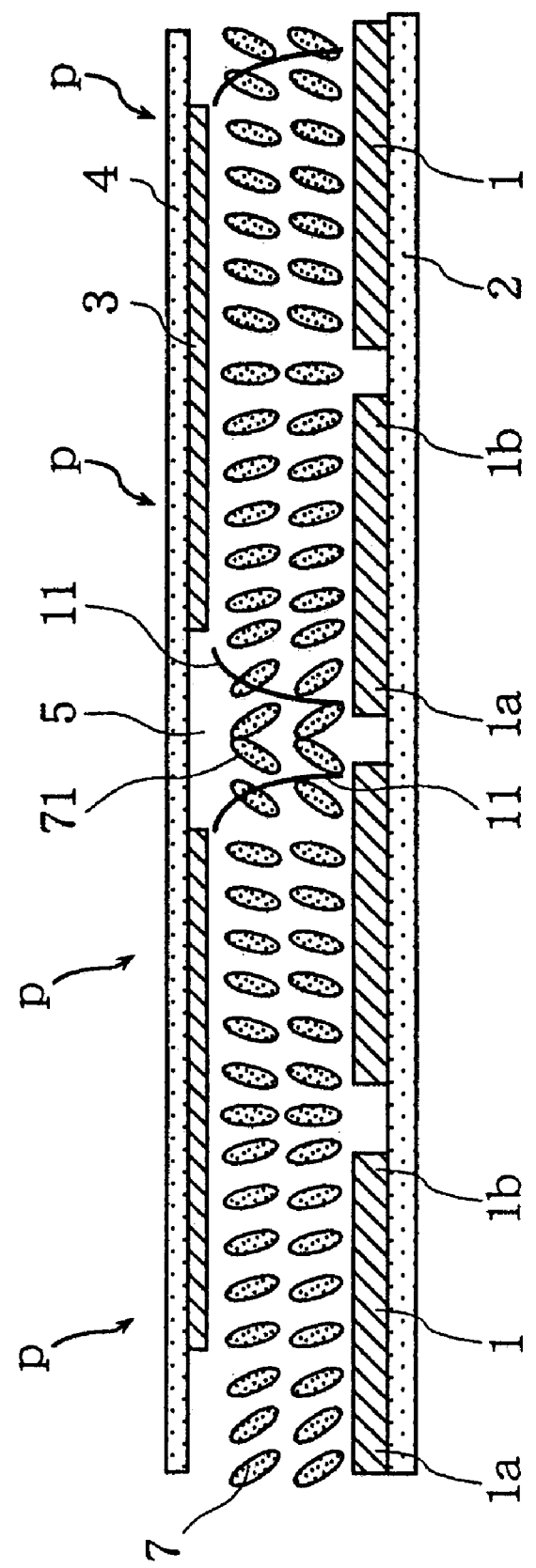
FIG. 14 is a front cross sectional view enlarging a main body of a liquid crystal element in the second group of inventions in the present invention.

A rectangular nonconductive portion 5 is provided on the opposite electrode 3 of the glass substrate 4. The nonconductive portion 5, as shown in FIG. 13, is a slender aperture which is disposed between adjacent pixel electrodes 1 at every four pixel electrodes 1. As shown in FIG. 14, in view of a direction at a right angle with the glass substrate 4, namely, Z direction (a direction from above) from which a user observes a display plane, a side 1a of each pixel electrode 1 is always opposite to the nonconductive portion 5, while the other side 1b of the pixel electrode 1 is not opposite to the nonconductive portion 5. As shown by a thick line in FIG. 13, 16 pixel electrodes 1 (4×4) are defined as a minimum unit 6 and four nonconductive portions 5 are provided for the minimum unit 6.

Four adjacent nonconductive portions 5, as shown in FIG. 13, are arrayed vertically in longitudinal and lateral directions, and an array of four nonconductive portions 5 in this pattern is repeated at each minimum unit 6. If a major axis of the nonconductive portion 5 is disposed continuously in line, a side of the nonconductive portion 5 is too close to a side of another nonconductive portion 5, and thereby a narrow gap between the nonconductive portions 5 is made. Consequently, an increase in resistance is caused. Then, when adjacent nonconductive portion 5 is arrayed vertically in longitudinal and lateral directions, resistance does not increase.

Figure 15:
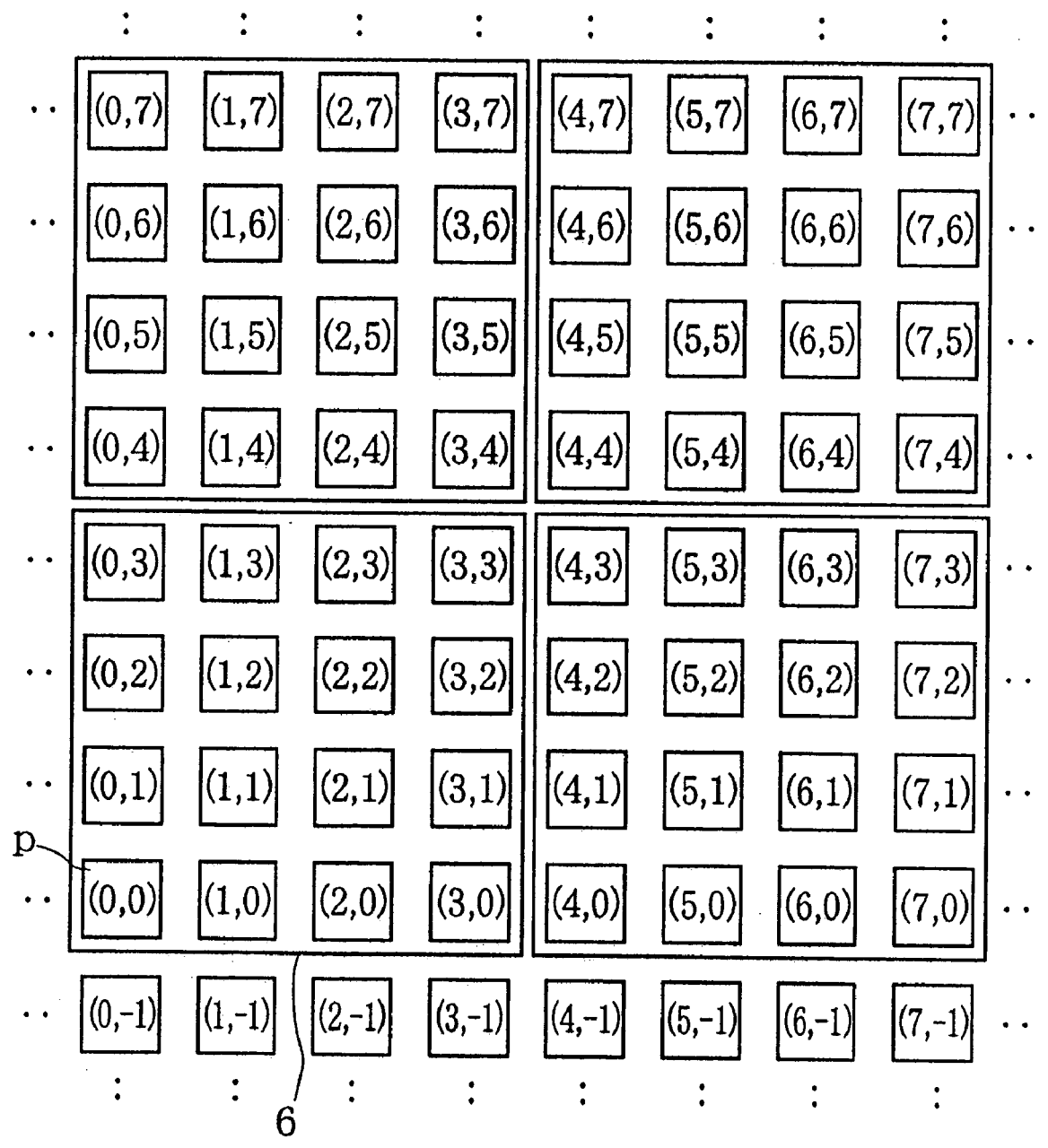

A pixel p in FIG. 13 is described by using coordinates shown in FIG. 15. A pixel p at the lower left shown in FIG. 13 is defined as an edge point (0, 0), and coordinates from the edge point to the right (X direction) is defined as (1, 0) to (7, 0) and coordinates from the edge point upward (Y direction) is defined as (0, 1) to (0, 7). For instance, the minimum unit 6 shown in FIG. 13 is a range of 4×4 pixels surrounded by pixels (0, 0), (3, 0), (3, 3) and (0, 3). A first nonconductive portion 5a shown in FIG. 13 exists between pixel (0, 0) and pixel (1, 0) and between pixel (0, 1) and pixel (1, 1). A second nonconductive portion 5b exists between pixel (0, 2) and pixel (0, 3) and between pixel (1, 2) and pixel (1, 3). A third nonconductive portion 5c exists between pixel (2, 0) and pixel (2, 1) and between pixel (3, 0) and pixel (3, 1). A fourth nonconductive portion 5d exists between pixel (2, 2) and pixel (3, 2) and between pixel (2, 3) and pixel (3, 3).

Four nonconductive portions 5 exist similarly in another minimum unit 6, such as a range surrounded by pixels (4, 0), (7, 0), (7, 3) and (4, 3). The edge point (0, 0) is coordinates as a standard point determined arbitrarily, and a pixel exists in minus coordinates in X direction as well as minus coordinates in Y direction.

An electric field 11 occurs in a side 1a of the pixel electrode 1 opposite to the nonconductive portion 5, as shown in FIG. 14, by thus arraying the nonconductive portion 5. Since a liquid crystal molecule 71 above the side 1a is inclined so that its major axis is at a right angle with a direction of the electric field 11, the liquid crystal molecule 71 above the side 1a is always aligned in a direction.

That is, each pixel p has an area in which a liquid crystal molecule 71 above the side 1a of the pixel electrode 1 is inclined for the nonconductive portion 5 of the opposite electrode 3 opposite to the pixel p.

In view of Z direction, the liquid crystal molecule 71 above each pixel electrode 1 is inclined in a direction shown by an arrow 8 in FIG. 13.

As clearly shown in FIG. 13, the liquid crystal molecules 71, 71 above each pixel are aligned in parallel in the same direction as a unit of two pixels p, p. Two pairs of two pixels p, p (such as (0, 0), (0, 1)), above which the liquid crystal molecules 71, 71 are aligned in the same direction, exist in four directions of up and down as well as right and left, namely, X, Y directions in 4×4 pixel structure. Accordingly, a characteristic of a viewing angle is improved in four directions toward up and down as well as right and left.

When a direction in which the liquid crystal molecule 71 is inclined is different in a display plane of a pixel p, a disclination line occurs in a boundary. In the second group of inventions, all of the boundary is an area of black matrix between pixels, originally, an area of black display. Consequently, a decrease in such an efficiency as transmittance never occurs.

Since adjacent nonconductive portions 5 are arrayed vertically, it is possible to make a distance between adjacent nonconductive portions 5, 5 widest. In addition, a technique of patterning ITO with a high precision is unnecessary, and an increase in resistance in a plane of ITO is never caused, and the unevenness of luminance on a display plane is never caused.

(The Result of Tests)

An opposite electrode 3 of ITO, wherein a nonconductive portion 5 (52×10 μm) is provided according to an array shown in FIG. 13, was formed on a glass substrate 4 by using a reflection type TFT substrate 2 wherein the number of pixels is 640×480, a pixel pitch is 26 μm, a width of an area in which the pixel and the nonconductive portion overlap is 2 μm, and Al is deposited in an area of a pixel electrode 1. A liquid crystal element was manufactured with a cell gap (electrode gap) of 2.0 μm between the TFT substrate 2 and the glass substrate 4. A liquid crystal with a negative dielectric anisotropy Δε and a birefringence of 0.08 was used. When a value test as a reflection type projector was executed by a catoptric set for a projector, an efficiency of 80% and a contrast (a ratio of transmittance of ON:OFF) of 1500:1 was obtained.

When the pixel electrode was observed by a microscope, a disclination line was not found in a display pixel.

(The Second and Third Liquid Crystal Elements)

Figure 16:
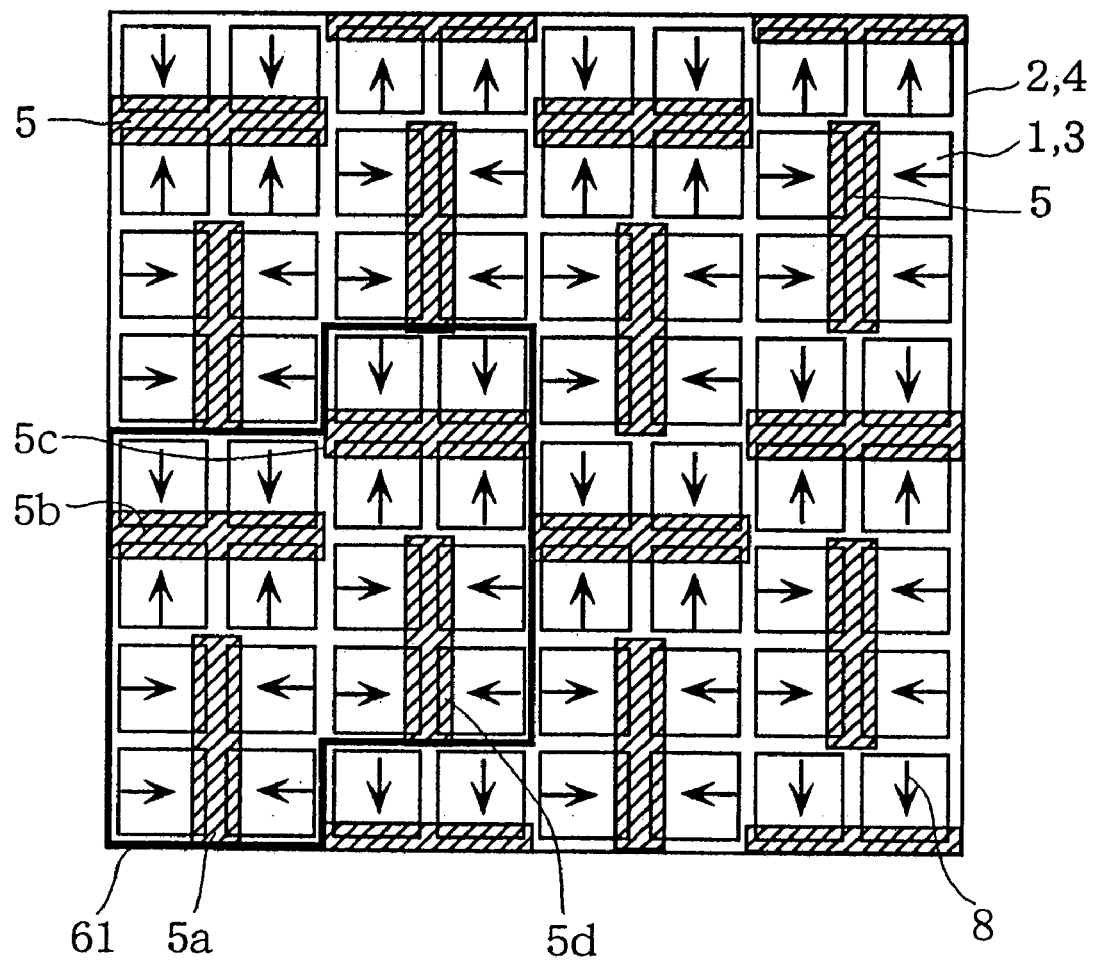
FIG. 16 is a plan view showing a conception of the second liquid crystal element in the second group of inventions in the present invention.
Figure 17:
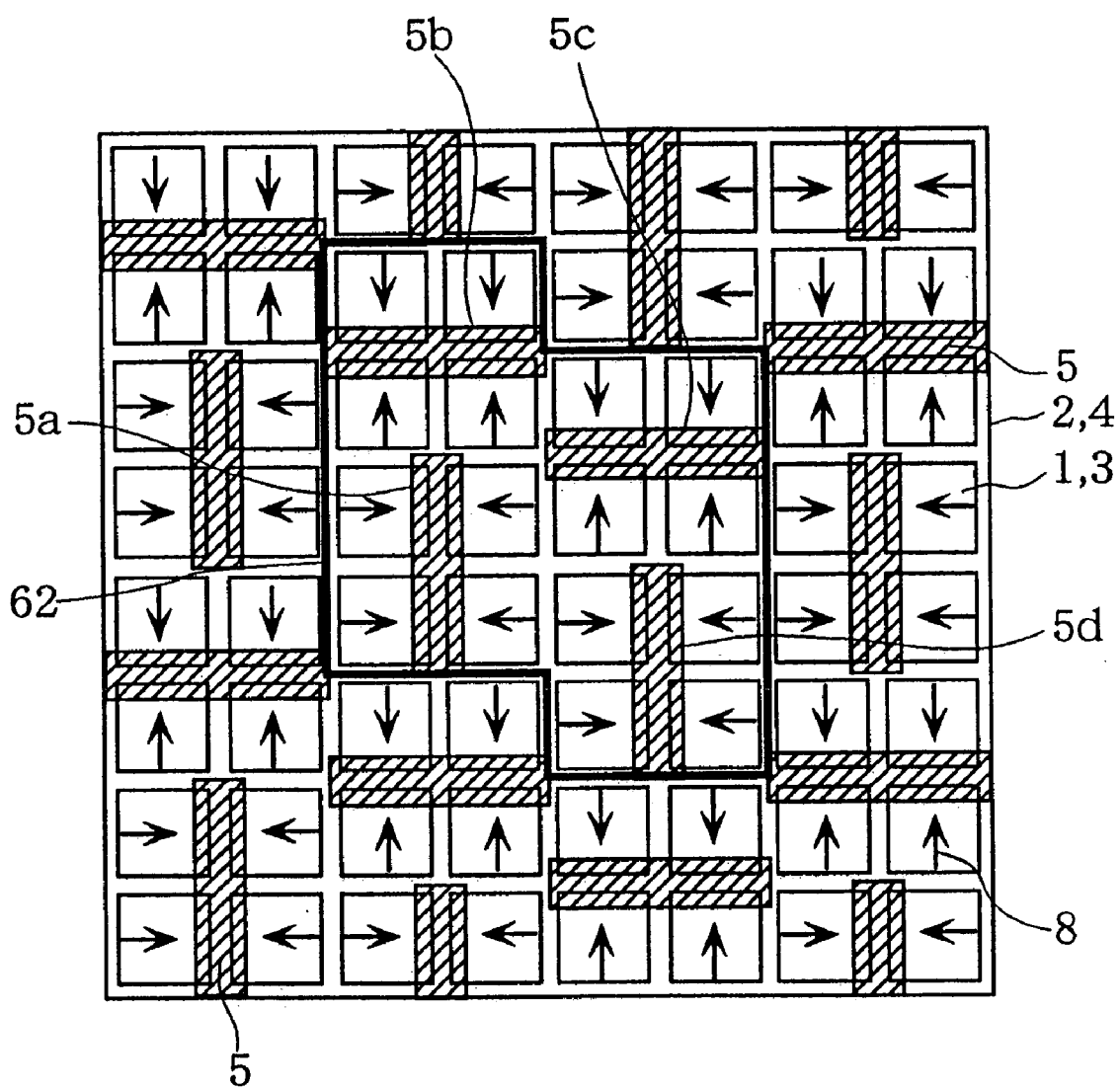
FIG. 17 is a plan view showing a conception of the third liquid crystal element in the second group of inventions in the present invention.

The second and third liquid crystal elements are described referring FIGS. 16 and 17. The second and third liquid crystal elements differ in a shape of a minimum unit 6 and an array of a nonconductive portion 5 from the first liquid crystal element.

A minimum unit of 4×4 pixels p is square in the first liquid crystal element, while the second and third liquid crystal elements have a shape in which a pair of pixels p, p on a diagonal line are shifted by a pixel in + or −(up and down) of Y direction. Accordingly, a minimum unit 61 and 62 of 4×4 pixels is not square, as shown in FIGS. 16 and 17, but a shape 61 and 62 having a little shift (by a pixel). The nonconductive portions 5 in the first liquid crystal element are arrayed vertically with each other in view of either of X, Y directions, while the nonconductive portions 5 in the second and third liquid crystal elements are not arrayed vertically with each other in spots.

A shape of the minimum unit 61 and a position of the nonconductive portions 5 in the second liquid crystal element are described by using coordinates shown in FIG. 15. The minimum unit 61 in the second liquid crystal element shown in FIG. 16 is a range except pixels (2, 0), (3, 0), (0, 4) and (1, 4), which is surrounded by pixels (0, 0), (3, 0), (3, 4) and (0, 4). A first nonconductive portion 5a in the minimum unit 61 exists between pixel (0, 0) and pixel (1, 0) and between pixel (0, 1) and pixel (1, 1). A second nonconductive portion 5b exists between pixel (0, 2) and pixel (0, 3) and between pixel (1, 2) and pixel (1, 3). A third nonconductive portion 5c exists between pixel (2, 3) and pixel (2, 4) and between pixel (3, 3) and pixel (3, 4). A fourth nonconductive portion 5d exists between pixel (2, 1) and pixel (3, 1) and between pixel (2, 2) and pixel (3, 2).

The minimum unit 62 in the third liquid crystal element shown in FIG. 17 is a range except pixels (0, −1), (1, −1), (2, 3) and (3, 3), which is surrounded by pixels (0, −1), (3, −1) (3, 3) and (0, 3) when a pixel of the third position from left and the fourth position from bottom in FIG. 17 is defined as an edge point (0, 0). The coordinates of the nonconductive portions 5 in the third liquid crystal element are as follows. A first nonconductive portion 5a in the minimum unit 61 exists between pixel (0, 0) and pixel (1, 0) and between pixel (0, 1) and pixel (1, 1). A second nonconductive portion 5b exists between pixel (0, 2) and pixel (0, 3) and between pixel (1, 2) and pixel (1, 3). A third nonconductive portion 5c exists between pixel (2, 1) and pixel (2, 2) and between pixel (3, 1) and pixel (3, 2). A fourth nonconductive portion 5d exists between pixel (2, −1) and pixel (3, −1) and between pixel (2, 0) and pixel (3, 0).

The same effect as the first liquid crystal element was obtained in the second and third liquid crystal elements thus arrayed.

(The Fourth Liquid Crystal Element)

Figure 18A:
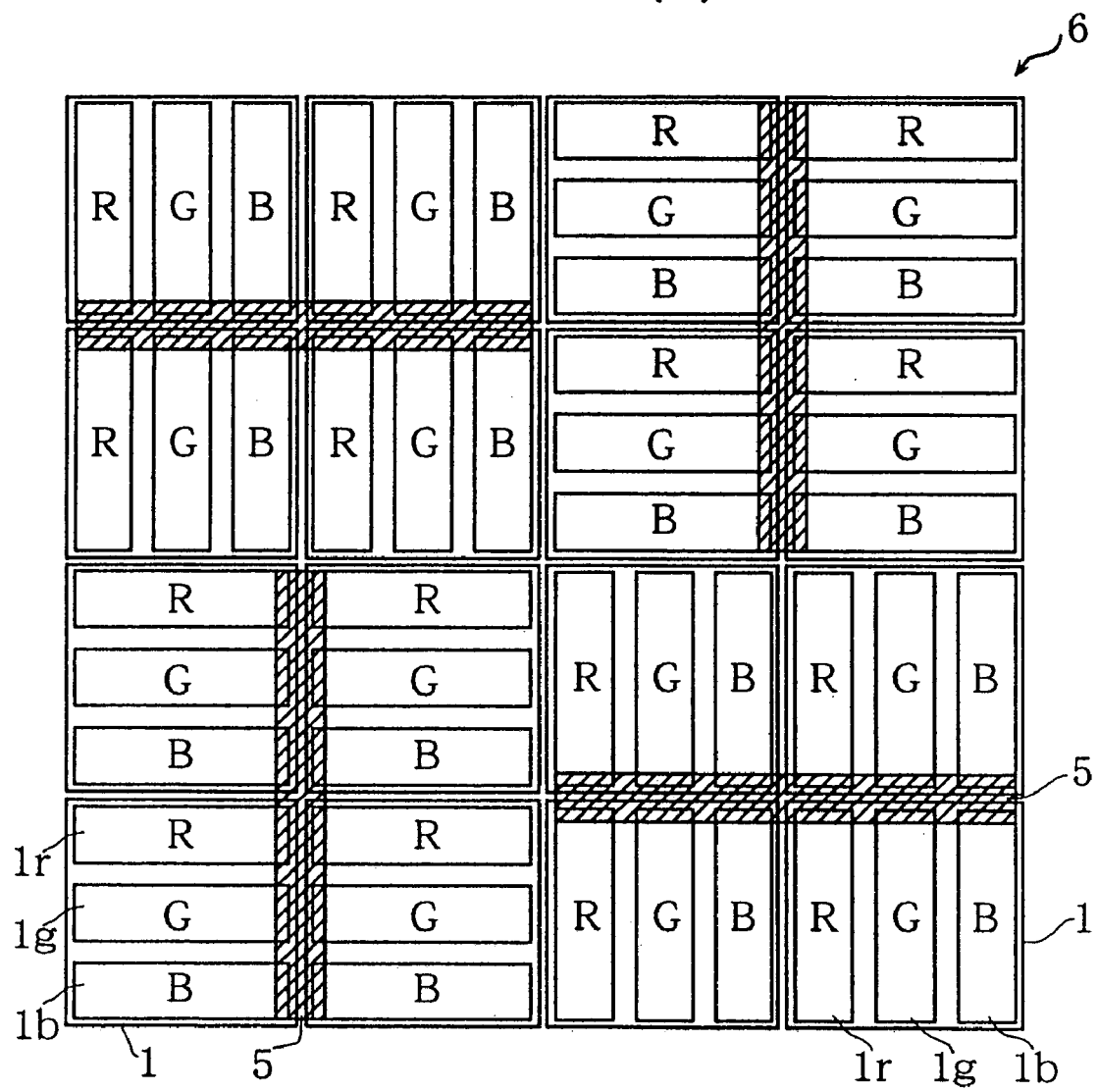
FIG. 18 is a plan view showing a conception of the fourth liquid crystal element in the second group of inventions in the present invention.
Figure 18B:
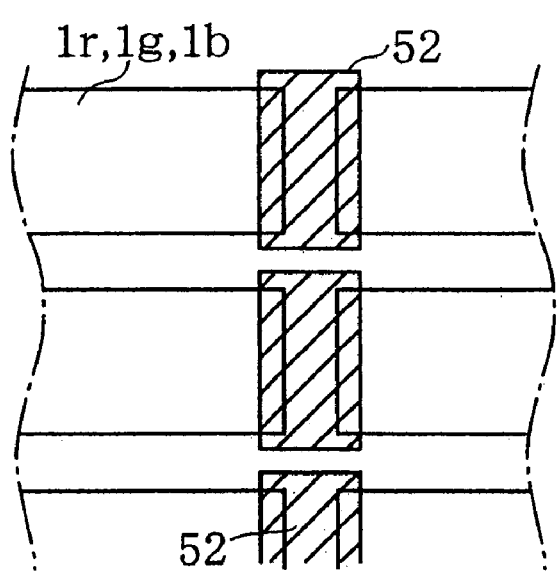
Figure 18C:
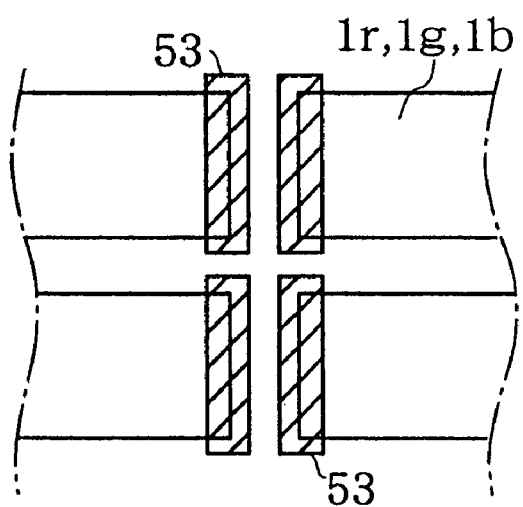

The fourth liquid crystal element is described referring FIG. 18. In the fourth liquid crystal element, as shown in FIG. 18(*a*), a pixel electrode 1 is composed of three rectangular minor pixel electrodes 1r, 1g and 1b for red (R), green (G) and blue (B) respectively for a color display.

A nonconductive portion 5 is provided between six pairs of adjacent minor pixel electrodes 1r, 1r; 1g, 1g; and 1b, 1b at every four pixel electrodes 1. Accordingly, a minimum unit 6 is composed of a set of 3×4×4 minor pixels, 48 in total.

The nonconductive portion 5 may be a portion 52 formed by dividing into an area in which shorter sides of the rectangular minor pixel electrodes 1r, 1g and 1b are opposite to each other, as shown in FIG. 18(*b*), and a portion 53 formed at each area of a shorter side of the rectangular minor pixel electrodes 1r, 1g and 1b, as shown in FIG. 18(*c*). Therefore, the smaller the nonconductive portion 5 of an opposite electrode 3 is, the more the voltage resistance decreases, depending on the size of a display plane and a pixel, though.

If a cheap opposite electrode for general use can be applied to a narrow gap (9 to 15 μm×3 to 5 μm) between minor pixels under the development of technology in future, the effect will be remarkable.

(The Fifth Liquid Crystal Element)

Figure 19A:
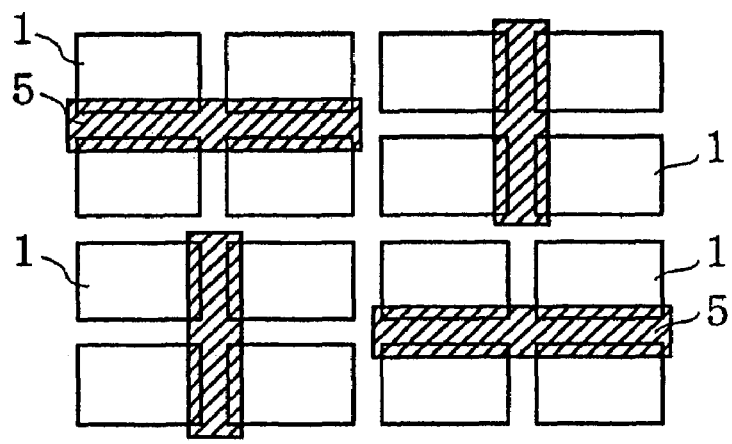
FIG. 19 is a plan view showing a conception of the fifth liquid crystal element in the second group of inventions in the present invention.
Figure 19B:
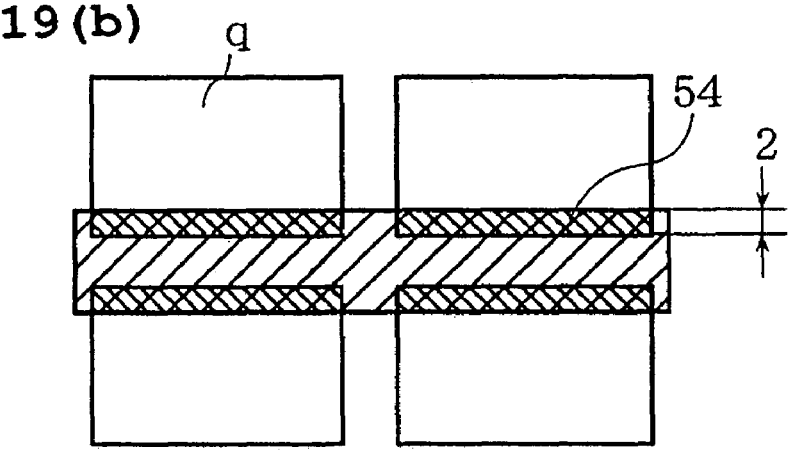
Figure 19C:
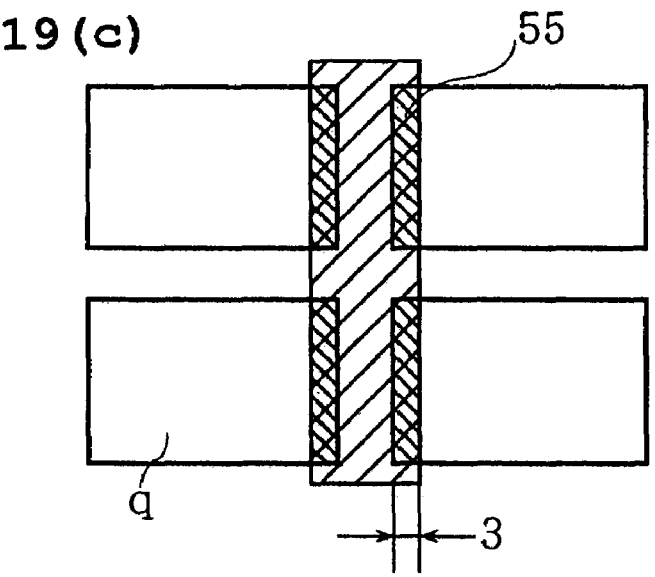

The fifth liquid crystal element is described referring FIG. 19. The fifth liquid crystal element is characterized in that a pixel electrode 1 is not a square like the above-mentioned the first to fourth liquid crystal elements, but a rectangle wherein a ratio of its longer side to its shorter side is 3:2, as shown in FIG. 19(*a*). However, the ratio can be changed according to the size of a liquid crystal element and a ratio of an array of pixels.

In this case, as shown in FIG. 19(*b*), a width of an area 54 in which a nonconductive portion 5 overlaps with a longer side of the pixel electrode 1 is 2 μm, and as shown in FIG. 19(*c*), a width of an area 55 in which a nonconductive portion 5 overlaps with a shorter side of the pixel electrode 1 is 3 μm.

The nonconductive portion 5 can have an influence on a liquid crystal molecule in an area q away from the overlap on a pixel by making an area 55 in a direction of a shorter side wider than an area 54 in a direction of a longer side.

(The Sixth Liquid Crystal Element)

Figure 20A:
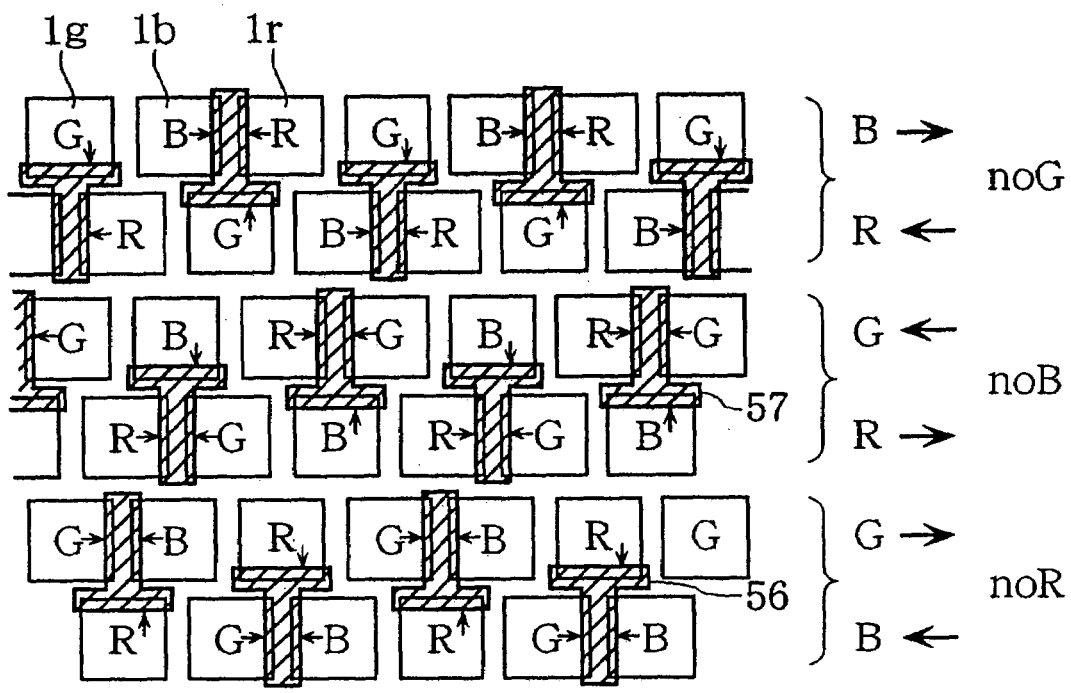
FIG. 20 is a plan view showing a conception of the sixth liquid crystal element in the second group of inventions in the present invention.

The sixth liquid crystal element is described referring FIG. 20. In the sixth liquid crystal element, as shown in FIG. 20(a), three pixel electrodes 1r; 1g and 1b for red, green and blue respectively are arrayed in a delta system for a color display.

In this case, an alignment of each color is eliminated with 36 pixels by disposing a T-shaped nonconductive portion 56 and a reverse T-shaped nonconductive portion 57 appropriately. For instance, by means of providing the nonconductive portions 56 and 57 between the pixel electrode for red 1r and the pixel electrode for blue 1b on the first and second rows from the top, a liquid crystal molecule 71 falls leftward in the pixel electrode for red 1r, and a liquid crystal molecule 71 falls rightward in the pixel electrode for blue 1b, and a liquid crystal molecule 71 falls in no direction in the pixel electrode for green 1g. A direction, in which a liquid crystal molecule 71 falls on other rows, is shown on the right of FIG. 20(a).

Figure 20B:
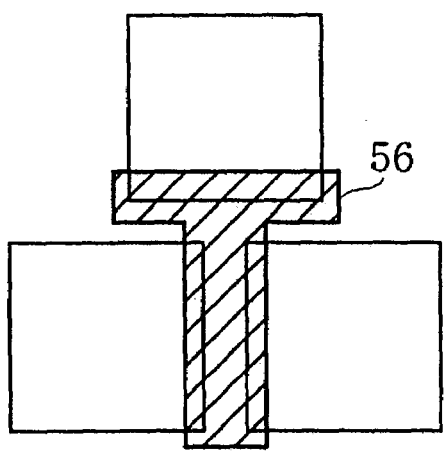
Figure 20C:
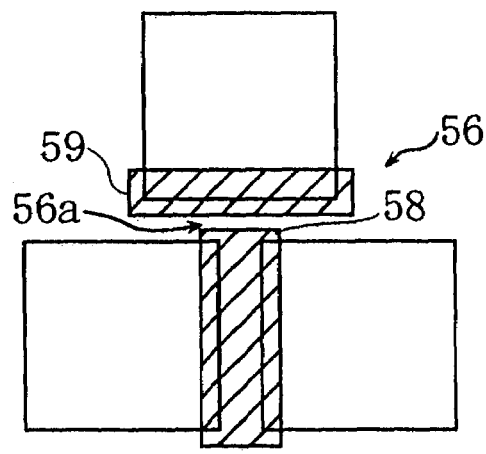

The T-shaped nonconductive portion 56 is formed integrally as shown in FIG. 20(b), and additionally, as shown in FIG. 20(c), a decrease in voltage can be prevented by dividing the nonconductive portion 56 into a part 58 in a longitudinal direction and a part 59 in a lateral direction, and forming a cutting part 56a.

In the sixth liquid crystal element, although a little malfunction is expected to occur in an end theoretically, no trouble was caused actually and an extremely superior color display was obtained.

(The Seventh Liquid Crystal Element)

Figure 21:
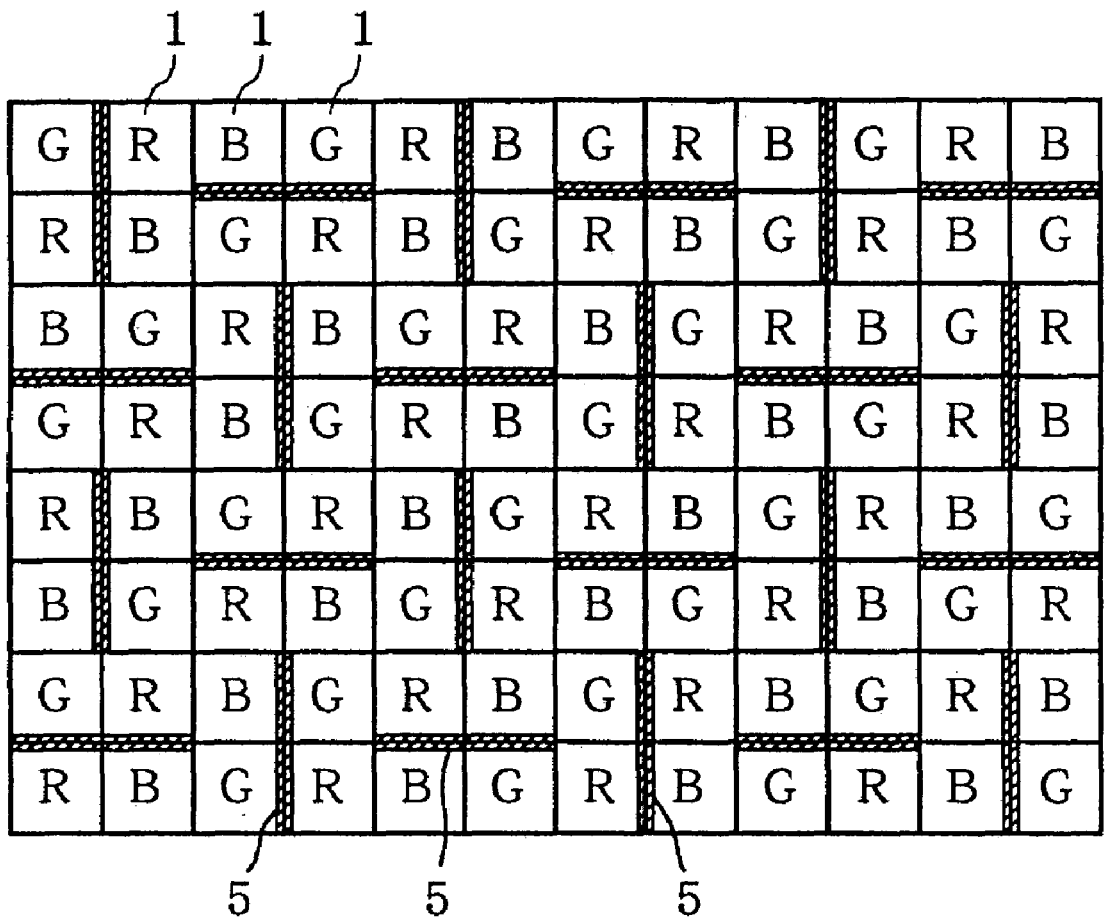
FIG. 21 is a plan view showing a conception of the seventh liquid crystal element in the second group of inventions in the present invention.

The seventh liquid crystal element is described referring FIG. 21. In the seventh liquid crystal element, as shown in FIG. 21, a small pixel electrode 1 10 μm square for three primary colors (red, green and blue; or cyan, magenta and yellow) is arrayed in a mosaic for a color display.

In this case, 96 pixels of 8 pixels in a longitudinal direction and 12 pixels in a lateral direction constitute a set unlike the case of black and white, and a ratio of a longitudinal direction to a lateral direction is 2:3, which is approximately similar to Braun tube and a standard of a ratio of pixels in longitudinal and lateral directions. Consequently, no trouble occurs in an array of pixels. The ratio of a longitudinal direction to a lateral direction can be adjusted by shifting a shape of a pixel from a square to a rectangle. In addition, a fine color display is obtained.

A nonconductive portion 5 is provided similarly to FIG. 13. A liquid crystal molecule 71 above each pixel electrode 1 is inclined for the nonconductive portion 5 like an arrow 8 in FIG. 13. The number of arrows of a direction, in which the liquid crystal molecule 71 above each pixel electrode for red, green and blue is inclined, is eight in each direction, as shown at the bottom of FIG. 21.

Figure 22:
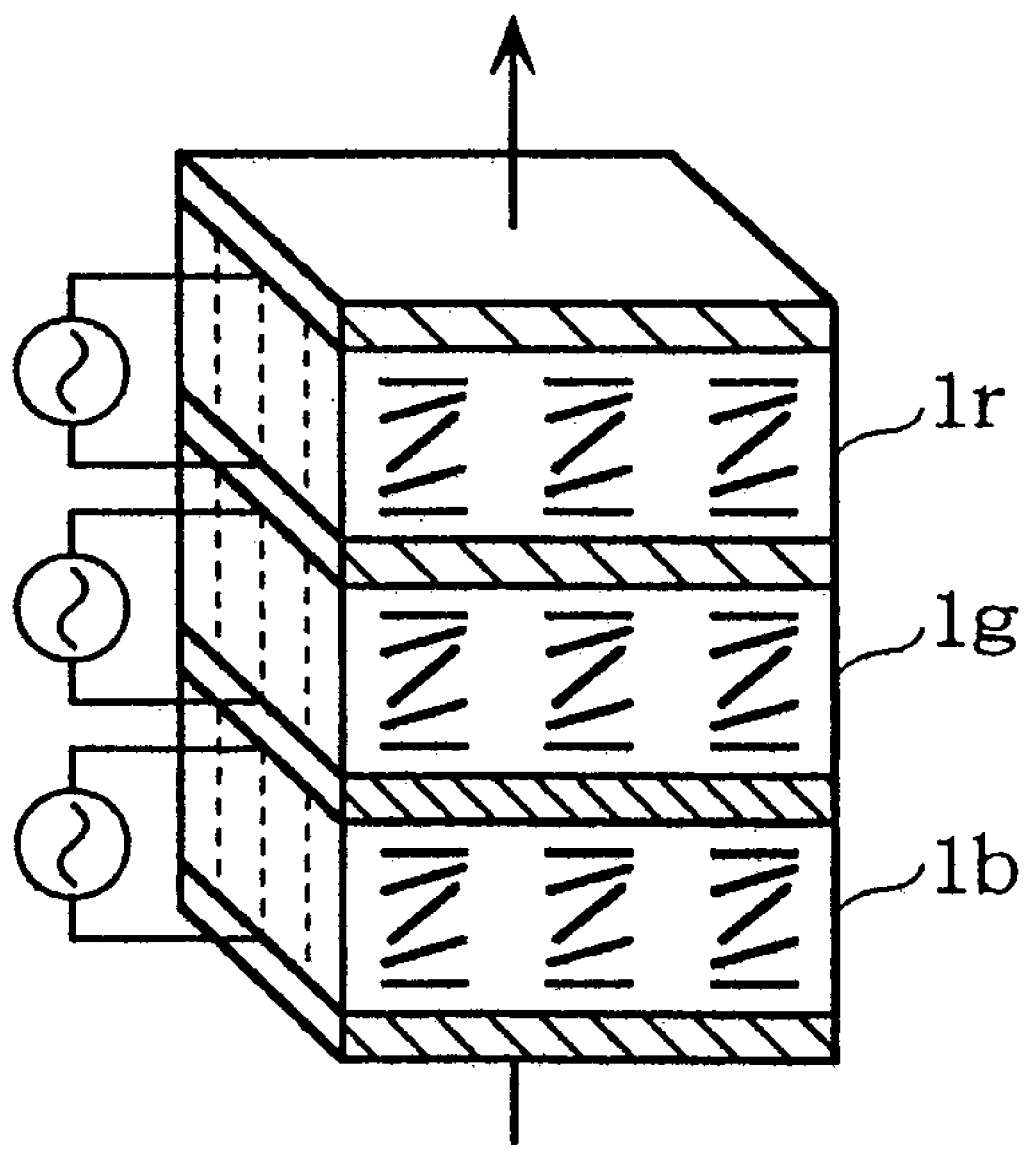
FIG. 22 is a perspective view showing a conception of a variation of a liquid crystal element in the second group of inventions in the present invention.

Needless to say, an array of pixels of each color may be the upper left direction, not the upper right direction as shown in FIG. 21. Furthermore, as shown in FIG. 22, a liquid crystal element may be a lamination type structure in which three pixel electrodes 1r, 1g and 1b for red, green and blue respectively or three pixel electrodes for cyan, magenta and yellow are laminated.

The second group of inventions is described above based on several liquid crystal elements, and needless to say, the second group of inventions are not limited to these liquid crystal elements. That is, for instance, the second group of inventions may be as described below.

1) A liquid crystal element may be either of a reflection type and a transmission type, and may be used for either of a direct-vision type like monitor and a projection type.
2) A pixel electrode may be either of a transparent electrode like ITO and a reflective electrode like Al, Ag and dielectric mirror.
3) As regards the size of a nonconductive portion 5, although it is preferable that its shorter side is 2 μm or more since an angle of a diagonal electric field becomes larger and an alignment is improved, its shorter side may be less than 2 μm due to other conditions.
4) A method of manufacturing a rectangular nonconductive portion 5 is without mention, and a nonconductive portion 5 can be manufactured with a body except an aperture.

What is claimed is:

1. A liquid crystal element, comprising:

a multitude of pixel electrodes;

a liquid crystal to which an electric field is applied by said pixel electrodes, said liquid crystal has such a structure that a four-sided minute pixel electrode is arrayed in a lattice in X, Y directions crossing each other at a right angle on a display plane and said non-conductive portion;

an inclined structure, wherein an electric field direction of the liquid crystal between at least one pair of adjacent pixels is inclined against an electrode plane; and an opposite electrode parallel with said pixel electrodes, wherein the liquid crystal is held between said pixel electrodes and said opposite electrode, the inclined structure has a non-conductive portion provided in a part of the opposite electrode that is opposite to a gap between at least one pair of adjacent pixel electrodes; and a side of the pixel electrode is opposite to the opposite electrode, and the other side of the pixel electrode is opposite to the non-conductive portion, wherein, in view of a Z direction at a right angle with X, Y directions when a pixel of i-th position in X direction and j-th position in Y direction from an edge point or a standard point is defined as p (i, j), said non-conductive portion, comprises:

a first nonconductive portion, with a rectangular shape having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1);

a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3);

a third nonconductive portion, with a rectangular shape having a longer side in X direction and a larger width in Y direction than a distance between a pixel p (4m+2, 4n) and a pixel p (4m+2, 4n+1), which includes an opposite electrode corresponding to each of at least a part of a gap between a pixel p (4m+2, 4n) and a pixel p (4m+2, 4n+1) as well as at least a part of a gap between a pixel p (4m+3, 4n) and a pixel p (4m+3, 4n+1); and a fourth nonconductive portion, with a rectangular shape having a longer side in Y direction and a larger width in X direction than a distance between a pixel p (4m+2, 4n+3) and a pixel p (4m+3, 4n+3), which includes an opposite electrode corresponding to each of at least a part of a gap between a pixel p (4m+2, 4n+2) and a pixel p (4m+3, 4n+2) as well as at least a part of a gap between a pixel p (4m+2, 4n+3) and a pixel p (4m+3, 4n+3).

2. A liquid crystal element, comprising:

a multitude of pixel electrodes;

a liquid crystal to which an electric field is applied by said pixel electrodes, said liquid crystal element has a structure such that a four-sided minute pixel electrode is arrayed in a lattice in X, Y directions crossing each other at a right angle on a display plane and said non-conductive portion;

an inclined structure, wherein an electric field direction of the liquid crystal between at least one pair of adjacent pixels is inclined against an electrode plane; and an opposite electrode parallel with said pixel electrodes, wherein the liquid crystal is held between said pixel electrodes and said opposite electrode, the inclined structure has a non-conductive portion provided in a part of the opposite electrode that is opposite to a gap between at least one pair of adjacent pixel electrodes; and a side of the pixel electrode is opposite to the opposite electrode, and the other side of the pixel electrode is opposite to the non-conductive portion, wherein, in view of a Z direction at a right angle with X, Y directions when a pixel of i-th position in X direction and j-th position in Y direction from an edge point or a standard point is defined as p (i, j), said non-conductive portion, comprises:

a first nonconductive portion, with a rectangular shape having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1);

a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3);

a third nonconductive portion, with a rectangular shape having a longer side in X direction and a larger width in Y direction than a distance between a pixel p (4m+3, 4n3) and a pixel p (4m+3, 4n+4), which includes an opposite electrode corresponding to each of at least a part of a gap between a pixel p (4m+2, 4n+3) and a pixel p (4m+2, 4n+4) as well as at least a part of a gap between a pixel p (4m+3, 4n+3) and a pixel p (4m+3, 4n+4); and a fourth nonconductive portion, with a rectangular shape having a longer side in Y direction and a larger width in X direction than a distance between a pixel p (4m+2, 4n+2) and a pixel p (4m+3, 4n+2), which includes an opposite electrode corresponding to each of at least a part of a gap between a pixel p (4m+2, 4n+1) and a pixel p (4m+3, 4n+1) as well as at least a part of a gap between a pixel p (4m+2, 4n+2) and a pixel p (4m+3, 4n+2).

3. A liquid crystal element, comprising:

a multitude of pixel electrodes;

a liquid crystal to which an electric field is applied by said pixel electrodes, said liquid crystal element has a structure such that a four-sided minute pixel electrode is arrayed in a lattice in X, Y directions crossing each other at a right angle on a display plane and said non-conductive portion;

an inclined structure, wherein an electric field direction of the liquid crystal between at least one pair of adjacent pixels is inclined against an electrode plane; and an opposite electrode parallel with said pixel electrodes, wherein the liquid crystal is held between said pixel electrodes and said opposite electrode, the inclined structure has a non-conductive portion provided in a part of the opposite electrode that is opposite to a gap between at least one pair of adjacent pixel electrodes; and a side of the pixel electrode is opposite to the opposite electrode, and the other side of the pixel electrode is opposite to the non-conductive portion, wherein, in view of a Z direction at a right angle with X, Y directions when a pixel of i-th position in X direction and j-th position in Y direction from an edge point or a standard point is defined as p (i, j), said non-conductive portion, comprises:

a first nonconductive portion, with a rectangular shape having a longer side in Y direction and a larger width in X direction than a distance between a pixel p (4m, 4n+1) and a pixel p (4m+1, 4n+1), which includes an opposite electrode corresponding to each of at least a part of a gap between a pixel p (4m, 4n) [m, n: an integer] and a pixel p (4m+1, 4n) as well as at least a part of a gap between a pixel p (4m, 4n+1) and a pixel p (4m+1, 4n+1);

a second nonconductive portion, with a rectangular shape having a longer side in X direction and a larger width in Y direction than a distance between a pixel p (4m+1, 4n+2) and a pixel p (4m+1, 4n+3), which includes an opposite electrode corresponding to each of at least a part of a gap between a pixel p (4m, 4n+2) and a pixel p (4m, 4n+3) as well as at least a part of a gap between a pixel p (4m+1, 4n+2) and a pixel p (4m+1, 4n+3);

a third nonconductive portion, with a rectangular shape having a longer side in X direction and a larger width in Y direction than a distance between a pixel p (4m+3, 4n+1) and a pixel p (4m+3, 4n+2), which includes an opposite electrode corresponding to each of at least a part of a gap between a pixel p (4m+2, 4n+1) and a pixel p (4m+2, 4n+2) as well as at least a part of a gap between a pixel p (4m+3, 4n+1) and a pixel p (4m+3, 4n+2); and a fourth nonconductive portion, with a rectangular shape having a longer side in Y direction and a larger width in X direction than a distance between a pixel p (4m+2, 4n) and a pixel p (4m+3, 4n), which includes an opposite electrode corresponding to each of at least a part of a gap between a pixel p (4m+2, 4n−1) and a pixel p (4m+3, 4n−1) as well as at least a part of a gap between a pixel p (4m+2, 4n) and a pixel p (4m+3, 4n).

4. The liquid crystal element according to claim 1, wherein said four-sided minute pixel electrode has a rectangular shape; and
   an area in which each of the first to fourth non-conductive portions with a rectangular shape, which includes said opposite electrode, overlaps with said rectangular pixel electrode and has a narrower width in a direction of a longer side of the pixel electrode than a width in a direction of a shorter side of the pixel electrode, in view of the Z direction.

5. The liquid crystal element according to claim 1, wherein said four-sided minute pixel electrode is square.

6. The liquid crystal element according to claim 1, wherein said four-sided minute pixel electrode is a pixel electrode for a color display in which a pixel for three primary colors is arrayed in a mosaic.

7. The liquid crystal element according to claim 4, wherein said four-sided minute pixel electrode is comprised of three four-sided minor pixel electrodes for three primary colors, which are arrayed vertically to a direction of a longer side of said first to fourth non-conductive portions with a rectangular shape.

8. The liquid crystal element according to claim 1, wherein said non-conductive portion with a rectangular shape has a lap of 2 µm in which a width of its shorter side is larger by 4 µm or more than a gap between two opposite pixels through its longer side.

9. The liquid crystal element according to claim 1, comprising a group of minor non-conductive portions which include an opposite electrode corresponding to at least a part of a gap between two opposite pixel electrodes or minor pixel electrodes through two longer sides of the non-conductive portion, instead of at least one of said first to fourth non-conductive portions.

10. A liquid crystal element, comprising:
   a multitude of pixel electrodes;
   a liquid crystal to which an electric field is applied by said pixel electrodes, said liquid crystal element has a structure such that a four-sided minute pixel electrode is arrayed in a delta system for a color display on a display plane;
   an inclined structure, wherein an electric field direction of the liquid crystal between at least one pair of adjacent pixels is inclined against an electrode plane; and
   an opposite electrode parallel with said pixel electrodes, wherein the liquid crystal is held between said pixel electrodes and said opposite electrode, the inclined structure has a non-conductive portion provided in a part of the opposite electrode that is opposite to a gap between at least one pair of adjacent pixel electrodes; and
   a side of the pixel electrode is opposite to the opposite electrode, and the other side of the pixel electrode is opposite to the non-conductive portion, wherein, when a pixel row of i-th position from a bottom side upward is defined as q(i), a group of three adjacent pixels of red, green and blue, which is composed of one of red, green and blue pixels in an odd pixel row q(2m+1) [m: an integer] and one of red, green and blue pixels in an even pixel row q(2m+2), is defined as a group of pixels for a color display and a group of pixels for a color display of j-th position from a left side on q(2m+1) and q(2m+2) is defined as Gq(j), said non-conductive portion, comprises:
   a first T-shaped nonconductive portion which includes an opposite electrode corresponding to each of at least a part of a gap between two adjacent pixels on q(2m+1) in a group of pixels for a color display composed of two pixels on q(2m+1) and a pixel on q(2m+2) as well as at least a part of a pixel on q(2m+2) facing said two pixels on q(2m+1);
   a first reverse T-shaped nonconductive portion adjacent to said first T-shaped nonconductive portion, which includes an opposite electrode corresponding to each of at least a part of a gap between two adjacent pixels on q(2m+2) in a group of pixels for a color display composed of a pixel on q(2m+1) and two pixels on q(2m+2) as well as at least a part of a pixel on q(2m+1) facing said two pixels on q(2m+2);
   a second T-shaped nonconductive portion shifted leftward by a pixel from said first T-shaped nonconductive portion, which includes an opposite electrode corresponding to each of at least a part of a gap between two adjacent pixels on q(2m+3) in a group of pixels for a color display composed of two pixels on q(2m+3) and a pixel on q(2m+4) as well as at least a part of a pixel on q(2m+4) facing said two pixels on q(2m+3);
   a second reverse T-shaped nonconductive portion adjacent to said second T-shaped nonconductive portion, which includes an opposite electrode corresponding to each of at least a part of a gap between two adjacent pixels on q(2m+4) in a group of pixels for a color display composed of a pixel on q(2m+3) and two pixels on q(2m+4) as well as at least a part of a pixel on q(2m+3) facing said two pixels on q(2m+4);
   a third T-shaped nonconductive portion shifted leftward by a pixel from said second T-shaped nonconductive portion, which includes an opposite electrode corresponding to each of at least a part of a gap between two adjacent pixels on q(2m+5) in a group of pixels for a color display composed of two pixels on q(2m+5) and a pixel on q(2m+6) as well as at least a part of a pixel on q(2m+6) facing said two pixels on q(2m+5); and
   a third reverse T-shaped nonconductive portion adjacent to said third T-shaped nonconductive portion, which includes an opposite electrode corresponding to each of at least a part of a gap between two adjacent pixels on q(2m+6) in a group of pixels for a color display composed of a pixel on q(2m+5) and two pixels on q(2m+6) as well as at least a part of a pixel on q(2m+5) facing said two pixels on q(2m+6).

11. The liquid crystal element according to claim 10, comprising:
   a longitudinal minor non-conductive portion forming a longitudinal area of the non-conductive portion between adjacent pixels in the same pixel row;
   a lateral minor non-conductive portion forming a lateral area between said adjacent pixels and a pixel in the same group of pixels for a color display as said adjacent pixels, which is opposite to both of these pixels; and
   a cutting portion of the non-conductive portion dividing said longitudinal minor non-conductive portion and said lateral minor non-conductive portion, instead of at least one of said first to third T-shaped and reverse T-shaped nonconductive portions.

12. The liquid crystal element according to claim 10, wherein said longitudinal minor non-conductive portion and said lateral minor non-conductive portion non-conductive portion with a lap of 2 µm having a common area with a width of at least 2 µm, in view of a Z direction at a right angle with a display plane on which a pixel is arrayed.

* * * * *